(12) United States Patent
Wang et al.

(10) Patent No.: US 11,899,212 B2
(45) Date of Patent: Feb. 13, 2024

(54) IMAGE DISPLAY METHOD AND DEVICE FOR HEAD MOUNTED DISPLAY

(71) Applicant: HUAWEI TECHNOLOGIES CO., LTD., Guangdong (CN)

(72) Inventors: Shixian Wang, Dongguan (CN); Yuchao Zhang, Shanghai (CN); Hailin Yuan, Dongguan (CN); Jian Chen, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/435,750

(22) PCT Filed: Mar. 27, 2020

(86) PCT No.: PCT/CN2020/081584
§ 371 (c)(1),
(2) Date: Sep. 2, 2021

(87) PCT Pub. No.: WO2020/200067
PCT Pub. Date: Oct. 8, 2020

(65) Prior Publication Data
US 2022/0155595 A1    May 19, 2022

(30) Foreign Application Priority Data

Mar. 29, 2019  (CN) .......................... 201910252501.1

(51) Int. Cl.
*G02B 27/01*    (2006.01)
*G09G 3/20*     (2006.01)

(52) U.S. Cl.
CPC ......... *G02B 27/0172* (2013.01); *G02B 27/01* (2013.01); *G09G 3/20* (2013.01);
(Continued)

(58) Field of Classification Search
CPC ................ G02B 27/01; G02B 27/0172; G02B 2027/0134; G02B 2027/014;
(Continued)

(56) References Cited

U.S. PATENT DOCUMENTS 5,523,886 A * 6/1996 Johnson-Williams ........................ H04N 13/344
                                                                        359/464
9,378,672 B2 * 6/2016 Chong .................. G09G 3/3208
(Continued)

FOREIGN PATENT DOCUMENTS

CN    103081486 A    5/2013
CN    103576325 A    2/2014
(Continued)

OTHER PUBLICATIONS

International Search Report and Written Opinion issued in PCT/CN2020/081584, dated Jun. 28, 2020, 11 pages.
(Continued)

*Primary Examiner* — Jason M Mandeville

(57) ABSTRACT

An image display method for a head mounted display (300) is disclosed. The head mounted display (300) includes a first display screen (3011) and a second display screen (3012). In a first time period S1 of an $i^{th}$ display cycle T, the head mounted display (300) displays an $i^{th}$ frame of a first image on the first display screen (3011). After stopping displaying the $i^{th}$ frame of the first image, the head mounted display (300) displays an $i^{th}$ frame of a second image on the second display screen (3012) in a second time period S2 of T. After the second time period, no image is displayed on the first display screen (3011) and the second display screen (3012). According to the method, a peak current of a device when displaying an image can be reduced.

16 Claims, 15 Drawing Sheets

(52) U.S. Cl.
CPC ............... *G02B 2027/014* (2013.01); *G09G 2340/0435* (2013.01)

(58) Field of Classification Search
CPC .... G02B 2027/0141; G02B 2027/0145; G02B 30/00; G02B 30/20; G02B 30/22; G02B 30/24; G09G 3/20; G09G 2340/0435
USPC .......................................................... 345/8
See application file for complete search history.

(56) References Cited

U.S. PATENT DOCUMENTS

| | | | |
|---|---|---|---|
| 9,438,896 B2* | 9/2016 | Herrmann | H04N 13/344 |
| 2012/0050508 A1* | 3/2012 | Lee | H04N 13/398 |
| | | | 348/56 |
| 2012/0206443 A1 | 8/2012 | Kimura et al. | |
| 2013/0057545 A1* | 3/2013 | Nakahata | G02B 30/24 |
| | | | 345/419 |
| 2015/0348327 A1 | 12/2015 | Zalewski | |
| 2017/0330496 A1 | 11/2017 | Oravainen | |
| 2018/0061121 A1 | 3/2018 | Yeoh et al. | |

FOREIGN PATENT DOCUMENTS

| | | |
|---|---|---|
| CN | 105027563 A | 11/2015 |
| CN | 105980976 A | 9/2016 |
| CN | 107329257 A | 11/2017 |
| CN | 108632598 A | 10/2018 |
| CN | 109256089 A | 1/2019 |
| CN | 109425988 A | 3/2019 |
| CN | 110221432 A | 9/2019 |
| EP | 2552119 A1 | 1/2013 |
| JP | 2012191588 A | 10/2012 |
| JP | 2012195894 A | 10/2012 |
| JP | 2016509245 A | 3/2016 |
| JP | 2017528935 A | 9/2017 |
| WO | 2018055899 A1 | 3/2018 |

OTHER PUBLICATIONS

Office Action issued in CN201910252501.1, dated Jan. 2, 2020, 6 pages.
Office Action issued in CN201910252501.1, dated Jul. 17, 2020, 7 pages.
Extended European Search Report issued in EP20784631, dated Feb. 21, 2022, 12 pages.
Office Action issued in JP2021-557718, dated Oct. 18, 2022, 6 pages.
Office Action issued in CN20110808168.5, dated Sep. 18, 2023, 7 pages.

* cited by examiner

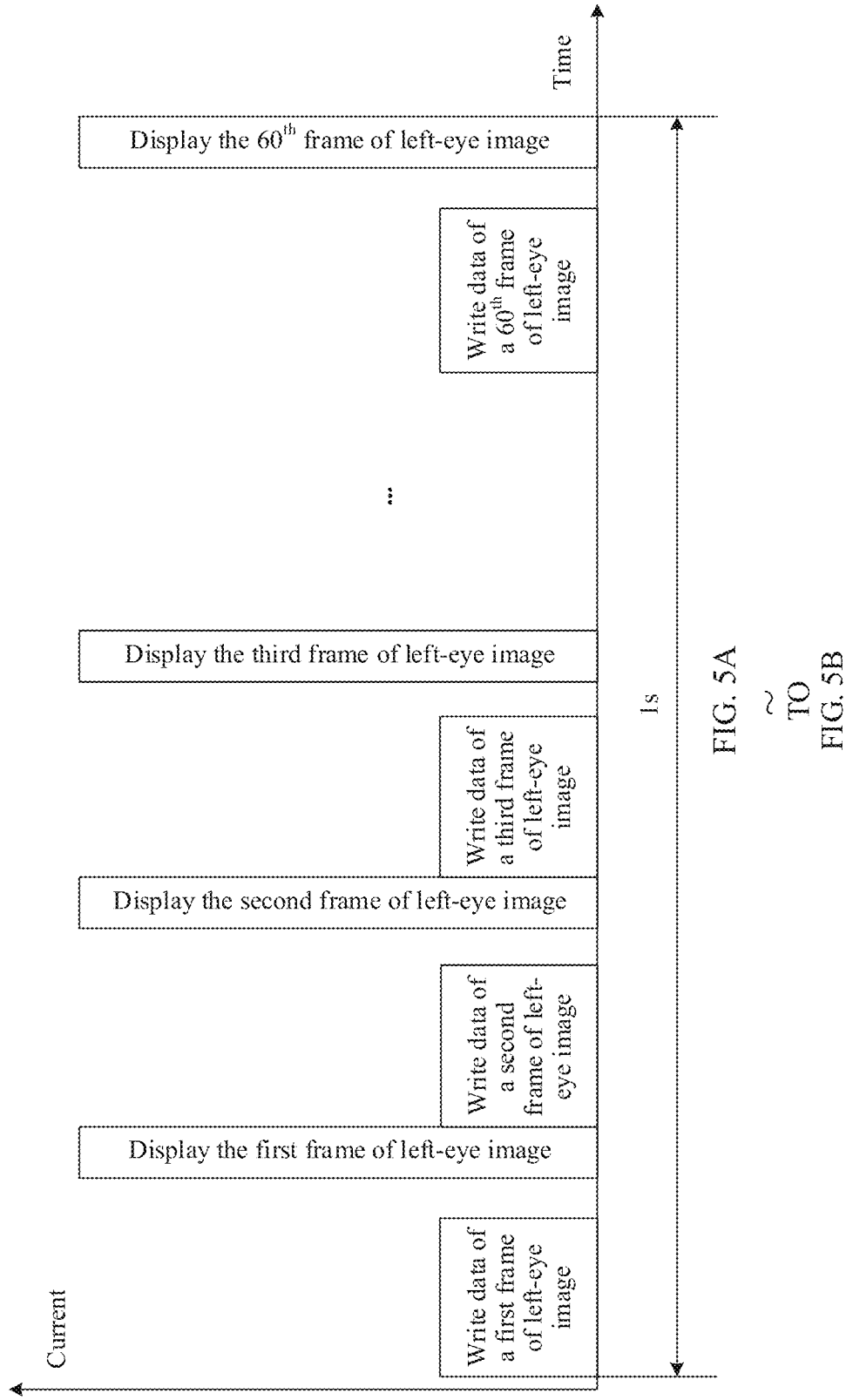

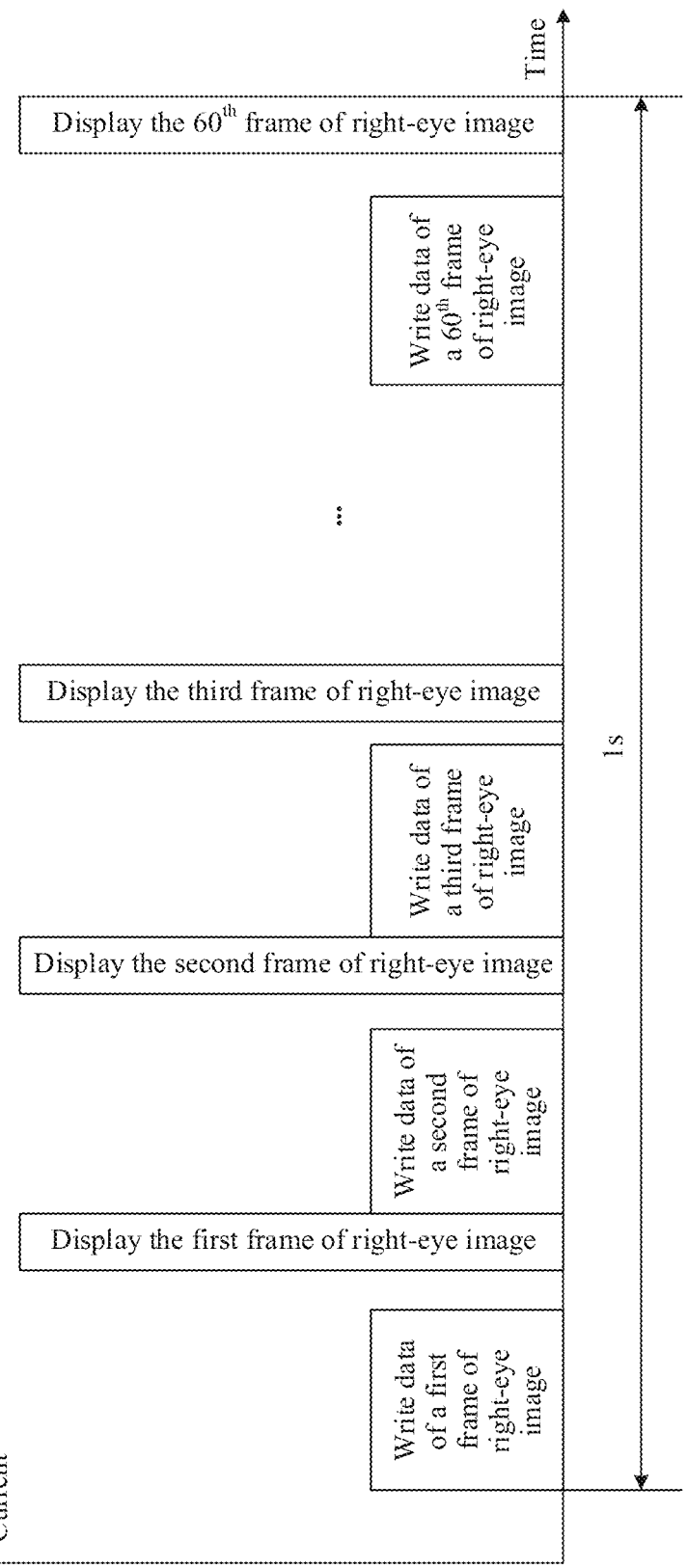

IMAGE DISPLAY METHOD AND DEVICE FOR HEAD MOUNTED DISPLAY

CROSS-REFERENCE TO RELATED APPLICATIONS

This application is a national stage of International Application No. PCT/CN2020/081584, filed on Mar. 27, 2020, which claims priority to Chinese Patent Application No. 201910252501.1, filed on Mar. 29, 2019. Both of the aforementioned applications are hereby incorporated by reference in their entireties.

TECHNICAL FIELD

Embodiments of this application relate to the field of display technologies, and in particular, to an image display method and device for a head mounted display.

BACKGROUND

Electronic devices present image information such as texts and graphics to users through displays, and can display pictures or play videos for the users, interact with the users in games, and so on. For example, an augmented reality (augmented reality, AR)/virtual reality (virtual reality, VR) head mounted display (head mounted display, HMD) can present images to users through a display screen, providing the users with immersive experience.

SUMMARY

Embodiments of this application provide an image display method and device for a head mounted display, so as to reduce a peak current of an electronic device when displaying an image.

To achieve the foregoing objective, the embodiments of this application use the following technical solutions:

According to an aspect, an embodiment of this application provides an image display method for a head mounted display, where the head mounted display includes a first display screen and a second display screen. The method includes: the head mounted display displays an $i^{th}$ frame of a first image on the first display screen in a first time period S1 of an $i^{th}$ display cycle, where i is a positive integer; and after stopping displaying the $i^{th}$ frame of the first image, the head mounted display displays an $i^{th}$ frame of a second image on the second display screen in a second time period S2 of the $i^{th}$ display cycle. After the second time period, no image is displayed on the first display screen and the second display screen in a third time period S3 of the $i^{th}$ display cycle, and the sum of the first time period S1, the second time period S2, and the third time period S3 is less than or equal to the display cycle.

In this solution, in a same display cycle, image display times of the first display screen and the second display screen may be staggered, thereby reducing a peak current of the head mounted display. Between different display cycles, an image may be displayed at an interval of a time period, thereby avoiding problems such as smearing and blurring caused by an afterglow effect of human eyes, and improving user experience.

In a possible design, the head mounted display may be an augmented reality AR head mounted display, a virtual reality VR head mounted display, or a mixed reality (mixed reality, MR) head mounted display.

In another possible design, in the $i^{th}$ display cycle, the first time period S1 is adjacent to the second time period S2, and the sum of the first time period S1, the second time period S2, and the third time period S3 is equal to the display cycle.

In other words, in a same display cycle, the head mounted display starts to display the second image after stopping displaying the first image, thereby minimizing a probability that a user perceives asynchronous displaying of the first image and the second image, screen flickering, or incompliance with an actual situation, or feels uncomfortable, for example, dizzy.

In another possible design, the first time period S1 and the second time period S2 are spaced by a fourth time period S4.

The fourth time period S4 is generally short, for example, may be less than or equal to 2 ms, so that it is not easy for the user to perceive asynchronous displaying of the first image and the second image, screen flickering, incompliance with an actual situation, or the like, and discomfort such as dizziness is avoided for the user as much as possible.

In another possible design, the first time period S1 and the second time period S2 are equal or not equal.

In other words, in a same display cycle, display duration of the first image and display duration of the second image may be the same or different.

In another possible design, the first display screen and the second display screen respectively display an image used for viewing by a left eye of the user and an image used for viewing by a right eye of the user.

According to another aspect, an embodiment of this application provides an image display method for a head mounted display, where the head mounted display includes a first display screen and a second display screen. The method includes: the head mounted display displays an $i^{th}$ frame of a first image on the first display screen in a first time period S1 of an $i^{th}$ display cycle, where i is a positive integer, and the first time period S1 is less than the display cycle; and the head mounted display displays an $i^{th}$ frame of a second image on the second display screen in a second time period S2 of an $(i+1)^{th}$ display cycle, where the second time period S2 is less than the display cycle, and the second time period and the first time period may be equal or not equal.

In this solution, the first display screen and the second display screen may display the first image and the second image at intervals between different display cycles, that is, display times of the two display screens may be staggered, thereby reducing a peak current of the head mounted display, and further avoiding problems such as smearing and blurring caused by an afterglow effect of human eyes, and improving user experience.

According to still another aspect, an embodiment of this application provides an image display apparatus. The apparatus is included in a head mounted display, and the apparatus has a function of implementing behavior of the head mounted display in the method according to any one of the foregoing aspects and the possible designs. The function may be implemented by hardware or may be implemented by hardware by executing corresponding software. The hardware or the software includes at least one module or unit corresponding to the function, for example, a display module or unit, and a processing stopping module or unit.

According to another aspect, an embodiment of this application provides a head mounted display. The head mounted display may include: a first display screen and a second display screen, configured to display an image; one or more processors; a memory; and one or more computer programs. The one or more computer programs are stored in the memory, and the one or more computer programs include instructions. When the instructions are executed by the processor, the head mounted display is enabled to perform the image display method in any possible design of the foregoing aspects.

According to still another aspect, an embodiment of this application provides a computer storage medium that includes a computer instruction. When the computer instruction runs on a head mounted display, the head mounted display is enabled to perform the image display method in any possible design of the foregoing aspects.

According to another aspect, an embodiment of this application provides an electronic device. The electronic device may include: a first display screen and a second display screen, configured to display an image; one or more processors; a memory; and one or more computer programs. The one or more computer programs are stored in the memory, and the one or more computer programs include instructions. When the instructions are executed by the processor, the electronic device is enabled to perform the image display method in any possible design of the foregoing aspects.

According to still another aspect, an embodiment of this application provides a computer program product. When the computer program product runs on a computer, the computer is enabled to perform the image display method in any possible design of the foregoing aspects.

BRIEF DESCRIPTION OF DRAWINGS

FIG. 5A is a schematic diagram of a correspondence between an image display time and a current according to an embodiment of this application;

FIG. 5B is a schematic diagram of another correspondence between an image display time and a current according to an embodiment of this application;

DESCRIPTION OF EMBODIMENTS

Figure 1:
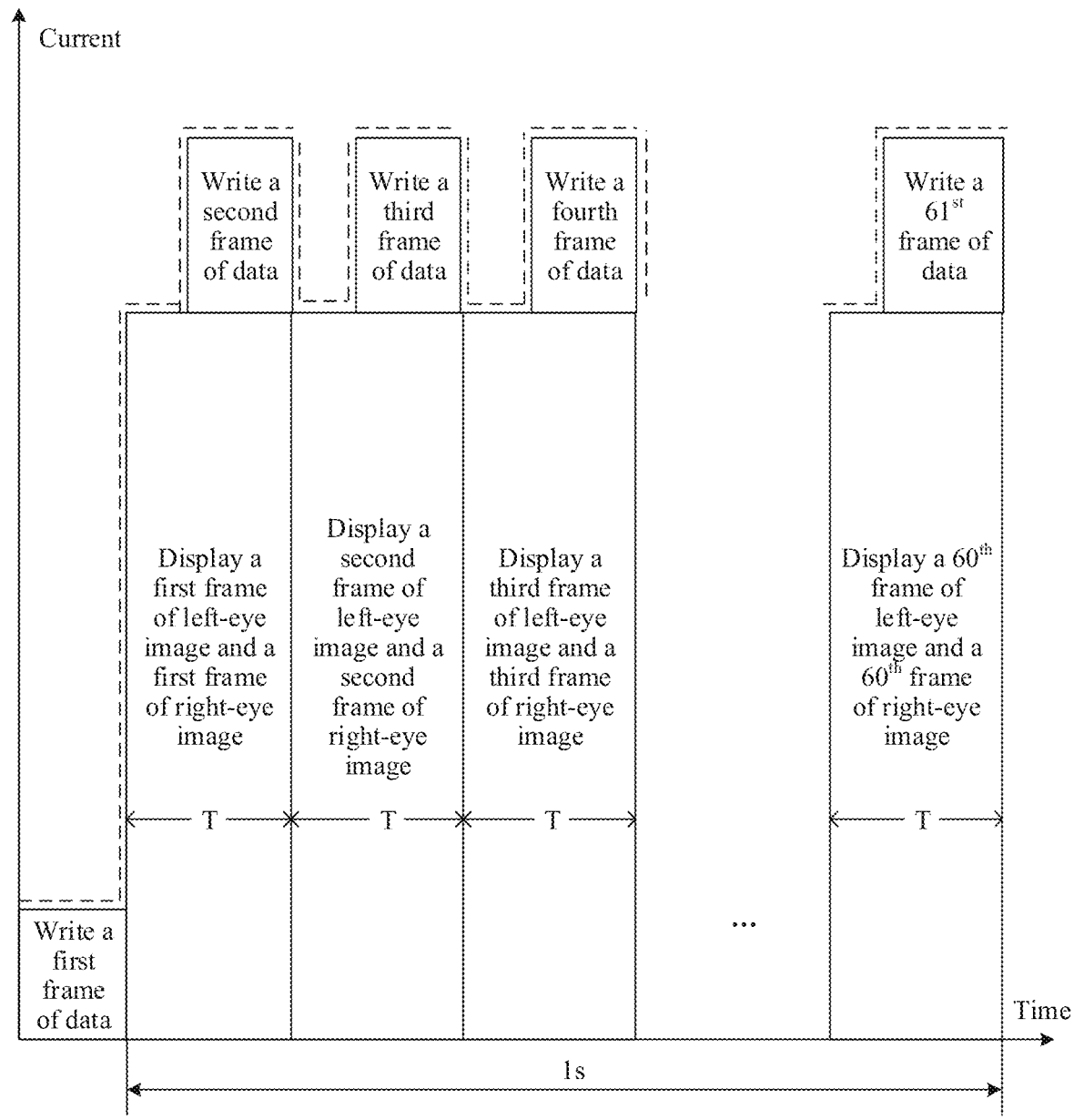
FIG. 1 is a schematic diagram of a correspondence between an image display time and a current according to a current technology.

The following describes the technical solutions in the embodiments of this application with reference to the accompanying drawings in the embodiments of this application. In description of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

AR is a technology that can superimpose a virtual object into a real scene, to implement virtual and real fusion and interaction in the real scene. AR can simulate and superimpose real information (such as visual information, sound, taste, and touch) that is difficult to experience in a specific time and space range of the real world by using science and technology such as a computer, and then apply the virtual information to the real world, which is perceived by human senses, so as to achieve sensory experience beyond reality. A real environment and a virtual object are superimposed into a same picture or space in real time for coexistence.

AR is content addition based on the real scene, is information integration of the real world and the virtuality, has real-time interactivity, and adds and locates a virtual object in three-dimensional scale space. For example, when a user watches, by using an AR device, a World Cup ball game played on another display device such as a television or a computer, an atmosphere and a feeling of watching the ball game on site can be achieved by using the augmented reality technology.

VR uses computer simulation to generate a virtual world in three-dimensional space, and provides users with simulation of visual, auditory, tactile, force, and other sensations, allowing the users to experience things in the three-dimensional space as if they were in the environment. Through body movements and audio-visual feelings, VR interacts with the users in a plurality of directions.

VR may include a simulated environment, perception, a natural skill, a sensing device, and the like. The simulated environment is a computer-generated, real-time, dynamic, and three-dimensional realistic picture. The perception means that VR has the perception that users have. In addition to visual perception generated by using a computer graphics technology, perception such as an auditory sensation, a tactile sensation, a force sensation, and a motion sensation is also included, and even an olfactory sensation, a taste sensation, and the like are also included. This is also referred to as multi-perception. The natural skill refers to head turning, eye movement, a gesture, or another human behavior or movement of a person. The computer processes data suitable for an action of a participant, makes a response to an input of the user in real time, and separately feeds back the response to five sense organs of the user. The sensing device is a three-dimensional interaction device. The sensing device can track the head motion of the user and then move an image projected by a VR device based on recorded data, so that the image can match a position of the head motion. When the user's head looks left, right, up, or down, the user can see the scene in these directions in the head mounted display. The sensing device can further track eye movements, so that the image projected by the VR device matches the eye movements.

VR devices are also referred to as VR glasses, VR helmets, VR portable cinemas, or the like. The VR device can generate an image with an unknown angle based on an image-based rendering (Image Based Rendering, IBR), and then obtain a series of scene images with different visual angles by performing processing such as transformation, interpolation, and deformation. An update speed of the series of images may be referred to as a refresh rate (or frame rate). A higher refresh rate reduces latency and allows users to have more responsive experience.

The VR device has a specific field of view (field of view, FOV). The field of view is a degree of a visual area (or field of view) of the VR device. A higher field of view indicates stronger immersion of users in the virtual reality experience. In the virtual reality experience, users may further wear data gloves covered with precision sensors, also known as wired gloves. By using the data gloves, users can perform actions such as grasping, moving, and rotating objects in the virtual scene.

MR includes augmented reality and augmented virtuality. By presenting virtual scene information in a real scene, an interactive feedback information loop is set up between the real world, the virtual world, and the user, to enhance the real feeling of user experience.

The AR/VR/MR device may generally be a head mounted display (head mounted display, HMD). The HMD may be used in a variety of scenes, such as playing games, virtual cinemas, virtual concerts, virtual sports games, virtual tours, or playing videos. For example, in the virtual cinema scene, the HMD can simulate an effect of a cinema, and a field of view of the HMD changes as the head of the user rotates. For example, when the user looks forward, a movie picture that is being played can be seen. When the user raises the head, the roof of the cinema can be seen in the field of view of the HMD. When the user turns the head to the left, the seat on the left and the audience on the seat can be seen in the field of view of the HMD. For another example, in a shooting game scene, when the user turns the head, the HMD can display the battle situation in other directions. If the user holds a weapon in the game, when the user pulls the trigger in reality, the HMD can display a picture of a bullet fired from the weapon, and so on.

The HMD may include a plurality of types, such as a split type, an integrated type, and a mobile end type.

The split-type HMD may be connected to an external device such as a computer or a mobile phone to receive augmented reality/virtual reality/mixed reality application data from the external device. The application data may include image data, and may further include audio data, and the like. The split-type HMD displays an image and plays an audio signal according to the application data, providing users with immersive experience.

The integrated HMD can generate augmented reality/virtual reality/mixed reality application data by using an internal processor, display an image, and play an audio signal, providing users with immersive experience.

The mobile-end HMD may have a mobile device such as a mobile phone inserted into the HMD, generate augmented reality/virtual reality/mixed reality application data by using the mobile device, display an image, and play an audio signal, providing users with immersive experience.

Generally, a display screen of the HMD may include a left display screen and a right display screen for displaying an image seen by the left eye (referred to as a left-eye image) and an image seen by the right eye (referred to as a right-eye image), respectively. In the brain, the user can fuse the seen left-eye image and the seen right-eye image to form a stereoscopic image.

Currently, in an HMD image display technical solution shown in FIG. 1, the HMD may include a first display screen and a second display screen, or referred to as a left display screen and a right display screen. The left display screen and the right display screen respectively correspond to two eyeballs of the user, and respectively display an image (that is, a left-eye image) used for viewing by a left eye of the user and an image (that is, a right-eye image) used for viewing by a right eye of the user. When the user uses the HMD, the HMD can obtain an image in real time according to a preset display frame rate f, and display the left-eye image and the right-eye image frame by frame. For example, the preset display frame rate f may be 60 fps (frame/second), 90 fps, 120 fps, or the like. FIG. 1 uses an example in which f is 60 fps for description.

The HMD may obtain f frames of left-eye images and f frames of right-eye images within a unit time, and may display one frame of left-eye image and one frame of right-eye image in each display cycle T. The display cycle may be a reciprocal of the display frame rate, that is, $T=1/f$. The HMD may display an $i^{th}$ frame of left-eye image (that is, the $i^{th}$ frame of image in the left-eye image) on the left display screen in an $i^{th}$ (i is a positive integer) display cycle, and at the same time display an $i^{th}$ frame of right-eye image (that is, the $i^{th}$ frame of image in the right-eye image) on the right display screen. The two frames of images are subject to information integration performed by the brain and then fused to form a stereoscopic image. In addition, after respectively displaying the $i^{th}$ frame of left-eye image and the $i^{th}$ frame of right-eye image on the two display screens in the $i^{th}$ display cycle, the HMD displays an $(i+1)^{th}$ frame of left-eye image and an $(i+1)^{th}$ frame of right-eye image in an $(i+1)^{th}$ display cycle. In addition, display duration of each frame of image is a display cycle. In other words, in each display cycle, the two display screens of the HMD have been always displaying images.

In the solution shown in FIG. 1, due to an afterglow effect (or referred to as a visual persistence phenomenon) of a human eye, when pictures of two adjacently displayed frames of images are switched, a picture before switching has a visual residue, and pictures before and after switching are superimposed. A phenomenon such as smearing or blurring occurs on a picture seen by the user, affecting user experience. For example, the human eye superimposes a first frame of left-eye image (that is, the first frame of image in the left-eye image) and a second frame of left-eye image (that is, the second frame of image in the left-eye image) that are adjacently displayed, and superimposes a first frame of right-eye image (that is, the first frame of image in the right-eye image) and a second frame of right-eye image (that is, the second frame of image in the right-eye image) that are adjacently displayed.

Figure 2:
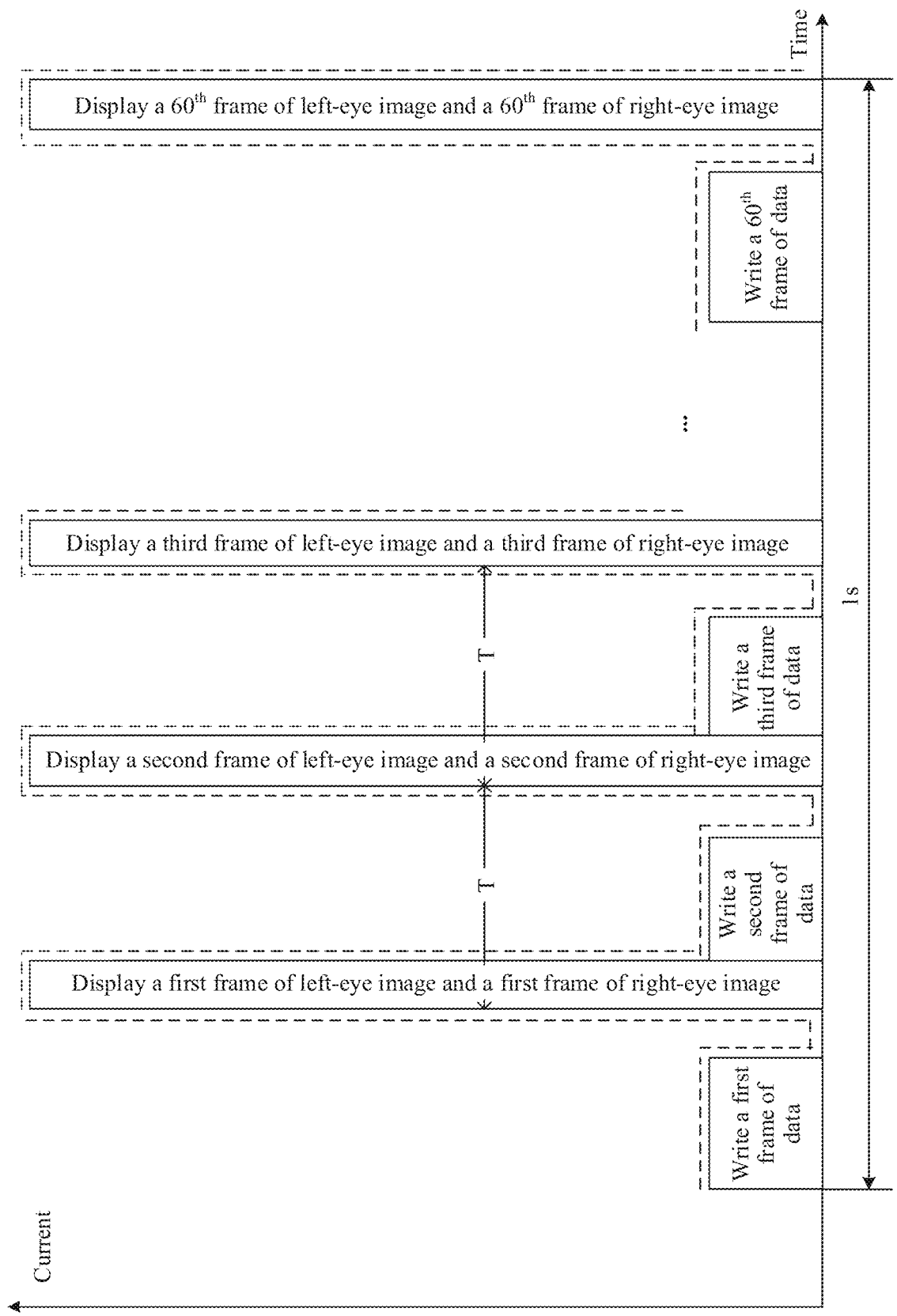
FIG. 2 is a schematic diagram of another correspondence between an image display time and a current according to a current technology.

FIG. 2 shows another technical solution for displaying an image by the HMD. Compared with the technical solution shown in FIG. 1, when a preset display frame rate f remains unchanged (for example, still 60 fps), the HMD can shorten display duration of each frame of left-eye image and each frame of right-eye image. In this way, after displaying of an $i^{th}$ frame of left-eye image and an $i^{th}$ frame of right-eye image is stopped, and before an $(i+1)^{th}$ frame of left-eye image and an $(i+1)^{th}$ frame of right-eye image start to be displayed, there is a time period in which neither the left display screen nor the right display screen displays an image. Alternatively, in a time period after displaying of an $i^{th}$ frame of left-eye image and an $i^{th}$ frame of right-eye image is stopped, and before an $(i+1)^{th}$ frame of left-eye image and an $(i+1)^{th}$ frame of right-eye image start to be displayed, the HMD inserts an all-black frame. In other words, the HMD performs impulse display.

In the display solutions shown in FIG. 1 and FIG. 2, when the left display screen and the right display screen simultaneously display images, the HMD needs to supply power to the left display screen and the right display screen at the same time, and a power supply current of the HMD is greater than a current obtained after a power supply current of the left display screen and a power supply current of the right display screen are superimposed. Therefore, a peak current of the HMD is relatively large.

When the peak current of the HMD is relatively large, a series of problems may occur. For example, the power supply of the HMD (such as a battery inside the HMD or an external device connected to the HMD) does not provide a sufficient current to power the HMD, which cannot meet peak current requirements for brightness of the left display screen and the right display screen. Consequently, the left display screen and the right display screen flicker, affecting the user's use. For another example, when the peak current is relatively large, components such as a chip, a battery, a resistor, and a capacitor in the HMD are easily damaged, resulting in relatively low system reliability of the HMD, and difficulty in component selection.

An embodiment of this application provides an HMD image display method, which may be applied to an AR/VR/MR electronic device. The electronic device may include a plurality of display screens, and display times of different display screens may be staggered, so as to reduce a magnitude of a current provided by the electronic device at a same moment for a display system in which the plurality of display screens are located, and reduce the peak current of the electronic device. This can reduce a current requirement of the electronic device on the power supply, so that the display screen can perform displaying stably without flickering, and can further reduce a probability of damage to components such as a chip, a battery, a resistor, and a capacitor in the electronic device, thereby improving system reliability, and broadening a component selection range. Different display screens of the electronic device may display the same image content or different image content, which is not limited in this embodiment of this application.

The electronic device may be a head mounted electronic device. The user may wear the head mounted electronic device to achieve different effects such as VR, AR, and MR. For example, the head mounted electronic device may be an HMD, for example, may be glasses, a helmet, or goggles. The head mounted electronic device may alternatively be another device that includes a plurality of display screens. A specific type of the electronic device is not limited in this embodiment of this application.

For example, when the head mounted electronic device is an HMD, the HMD may include a left display screen and a right display screen. The left display screen may display a left-eye image, and the right display screen may display a right-eye image. Unlike the display solution shown in FIG. 1 or FIG. 2, according to the display method provided in this embodiment of this application, display times of the left display screen and the right display screen may be staggered, thereby reducing the peak current of the HMD. This can reduce a current requirement of the HMD on the power supply, so that the left display screen and the right display screen can perform displaying stably without flickering, and can further reduce a probability of damage to components such as a chip, a battery, a resistor, and a capacitor in the HMD, thereby improving system reliability, and broadening a component selection range.

In addition, when an external device is configured to supply power to the HMD, and on the premise that an output voltage of the external device is constant, reducing the peak current of the HMD may further extending a connection line between the external device and the HMD, so that the user can move in a larger range when using the HMD. This improves user experience.

In addition, the brightness of the display screen perceived by human eyes is related to luminous time and luminous intensity of the display screen, and the luminous intensity is positively correlated with a magnitude of the power supply current. In the display solution shown in FIG. 2, display duration of the left display screen and the right display screen is shortened, that is, luminous time within unit time is shortened. To maintain relatively high brightness of the display screen perceived by human eyes, power supply currents of the left display screen and the right display screen need to be increased, so as to increase luminous intensity of the left display screen and the right display screen. Increasing the power supply current of the display screen causes the peak current of the HMD to be larger.

On one hand, unlike the display solution shown in FIG. 2, according to the display method provided in this embodiment of this application, the display times of the left display screen and the right display screen are staggered, so that a display time of the electronic device is relatively long. When a maximum power supply current of the electronic device remains unchanged, the method provided in this embodiment of this application enables the user to feel higher brightness.

On the other hand, when a rated current of the HMD is constant, according to the display method provided in this embodiment of this application, the peak current of the HMD may be relatively small. On the premise that the power supply current of the HMD is less than the rated current, the brightness of the display screen may be further increased by increasing the power supply current, thereby improving visual experience of the user.

For example, the rated current of the HMD is 2.5 A. In an existing display solution, a power supply current of the left display screen is 1 A, a power supply current of the right display screen is 1 A, a system current used to maintain running of another system component is 0.5 A, and a peak current of the HMD is 2.5 A. In the display solution provided in this embodiment of this application, a power supply current of the left display screen is 1 A, a power supply current of the right display screen is 1 A, the left display screen and the right display screen are staggered for display, and a system current is 0.5 A. In this case, the peak current of the HMD is 1 A. The display brightness of the left display screen and the right display screen is consistent with the display brightness in the existing display solution.

To improve the display brightness, in this embodiment of this application, the power supply currents of the left display screen and the right display screen may be increased. For example, the power supply current of the left display screen is 1.5 A, the power supply current of the right display screen is 1.5 A, the system current is 0.5 A, and the left display screen and the right display screen are staggered for display. The peak current of the HMD is 2.0 A, and the peak current of 2.0 A is still less than the rated current of 2.5 A. In other words, the display brightness of the display screen may be further improved while system stability of the HMD is ensured.

Figure 3:
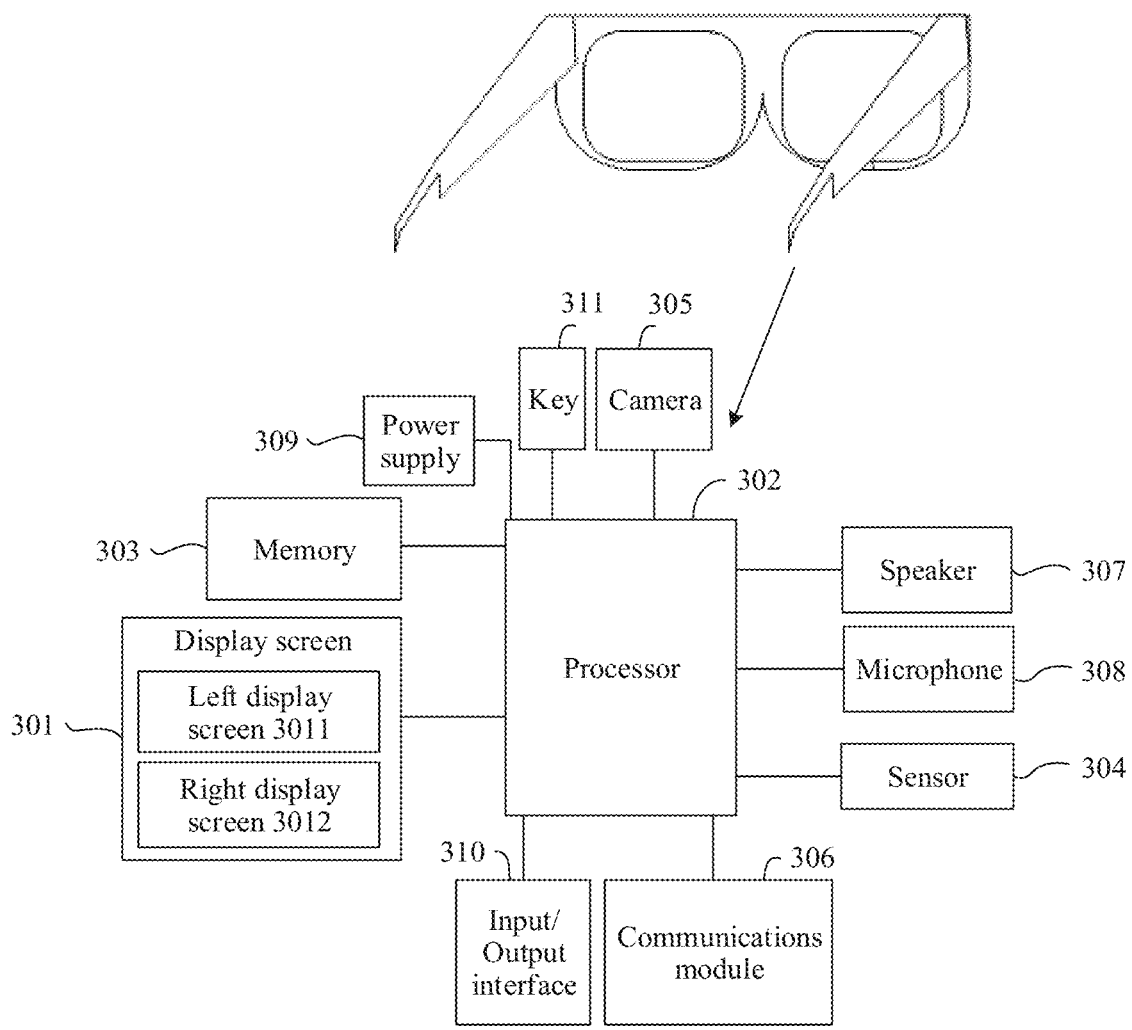
FIG. 3 is a schematic structural diagram of a head mounted display according to an embodiment of this application.

For example, FIG. 3 is a schematic structural diagram of an HMD 300 according to an embodiment of this application. When the HMD 300 is mounted on the user's head, the user's eyes can see an image presented on the display screen of the HMD 300.

It may be understood that, in this embodiment of this application, an example in which the electronic device is an HMD is used for description. However, this embodiment of this application is not limited to the HMD, and the electronic device may alternatively be another device.

As shown in FIG. 3, the HMD 300 may include a display screen 301, a processor 302, a memory 303, a sensor module 304, a camera 305, a communications module 306, a speaker 307, a microphone 308, a power supply 309, an input/output interface 310, a key 311, and the like.

It may be understood that the structure illustrated in this embodiment of this application does not constitute a specific limitation on the HMD. The HMD may have more or fewer components than those shown in FIG. 3, may combine two or more components, or may have different component configurations. For example, the HMD 300 may further include components such as an indicator lamp and a motor. The components shown in FIG. 3 may be implemented in hardware, software, or a combination of hardware and software including one or more signal processing or application-specific integrated circuits.

Two display screens 301 may be included, respectively corresponding to two eyeballs of the user. The two display screens can display content independently. Different images may be displayed on the two display screens to improve a stereoscopic effect of the images. The two display screens may include a left display screen 3011 for displaying a left-eye image and a right display screen 3012 for displaying a right-eye image. The image displayed on the left display screen 3011 and the image displayed on the right display screen 3012 may have a parallax, and the brain of the user can integrate the images of both eyes to achieve a stereoscopic visual effect having a spatial sense. When the display screen is transparent, the user's eyes can see a physical object through the display screen, or the user's eyes can see, through the display screen, an image displayed by another display apparatus.

The display screen 301 may be a liquid crystal display (liquid crystal display, LCD), an organic light-emitting diode (organic light-emitting diode, OLED), an active-matrix organic light-emitting diode (active-matrix organic light emitting diode, AMOLED), a flex light-emitting diode (flex light-emitting diode, FLED), Miniled, MicroLed, Micro-oLed, a quantum dot light-emitting diode (quantum dot light emitting diodes, QLED), or the like.

The processor 302 can execute application program code to implement various functional applications and data processing of the HMD 300. For example, the display occasion and display duration of the left display screen 3011 and the right display screen 3012 are separately controlled. Alternatively, image data, audio data, and the like of augmented reality/virtual reality/mixed reality are generated in response to head turning, eye movement, or another body movement of the user detected by the sensor module 304.

The processor 302 may include one or more processing units. For example, the processor 302 may include an application processor (application processor, AP), a modem processor, a graphics processing unit (graphics processing unit, GPU), an image signal processor (image signal processor, ISP), a video processing unit (video processing unit, VPU) controller, a memory, a video codec, a digital signal processor (digital signal processor, DSP), a baseband processor, and/or a neural-network processing unit (neural-network processing unit, NPU). Different processing units may be independent components, or may be integrated into one or more processors.

A memory may be further arranged in the processor 302 to store an instruction and data. In some embodiments, the memory in the processor 302 is a cache memory. The memory can store an instruction or data that the processor 302 has just used or used cyclically. If the processor 302 needs to use the instruction or data again, the instruction or data can be directly invoked from the memory. This avoids repeated access and shortens a waiting time of the processor 302, thereby improving system efficiency.

In some embodiments, the processor 302 may include one or more interfaces. The interface may include an inter-integrated circuit (inter-integrated circuit, I2C) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, a serial peripheral interface (serial peripheral interface, SPI) interface, and/or the like.

The I2C interface is a bidirectional synchronous serial bus, which includes a serial data line (serial data line, SDA) and a serial clock line (derail clock line, SCL). In some embodiments, the processor 302 may include a plurality of sets of I2C buses. The processor 302 may be separately coupled to the battery, the camera 305, and the like by using different I2C bus interfaces. The SPI interface may be used for connection between the processor and the sensor.

The UART interface is a universal serial data bus used for asynchronous communication. The bus may be a bidirectional communications bus. The bus switches to-be-transmitted data between serial communication and parallel communication. In some embodiments, the UART interface is usually configured to connect the processor 302 to the communications module 306. For example, the processor 302 communicates with a Bluetooth module in the communications module 306 through the UART interface, to implement a Bluetooth function.

The MIPI interface may be configured to connect the processor 302 to peripheral components such as the display screen 301 and the camera 305. The MIPI interface includes a camera serial interface (camera serial interface, CSI), a display serial interface (display serial interface, DSI), and the like. In some embodiments, the processor 302 communicates with the camera 305 through the CSI interface, to implement a photographing function of the HMD 300. The processor 302 communicates with the display screen 301 through the DSI interface, to implement a display function of the HMD 300.

The GPIO interface may be configured by software. The GPIO interface may be configured as a control signal, or may be configured as a data signal. In some embodiments, the GPIO interface may be configured to connect the processor 302 to the camera 305, the display screen 301, the communications module 306, the sensor module 304, the microphone 308, and the like. The GPIO interface may alternatively be configured as an I2C interface, an I2S interface, a UART interface, a MIPI interface, or the like.

The USB interface is an interface that complies with USB standard specifications, and may be specifically a Mini USB interface, a Micro USB interface, a USB Type C interface, or the like. The USB interface can be configured to connect a charger to charge the HMD 300, or can be configured to transmit data between the HMD 300 and a peripheral device. The USB interface can alternatively be configured to connect an earphone and play audio through the earphone. The interface may be further configured to connect to another electronic device, for example, a mobile phone. The USB interface may be USB 3.0, which is compatible with a high-speed display port (display port, DP) for signal transmission, and can transmit high-speed audio and video data.

It may be understood that the interface connection relationship between the modules illustrated in the embodiments of this application is merely an example for description, and does not constitute a limitation on the structure of the HMD 300. In some other embodiments of this application, the HMD 300 may alternatively use an interface connection mode that is different from those in the foregoing embodiments, or use a combination of a plurality of interface connection modes.

In some embodiments, by referring to a structure of a biological neural network, such as a transfer mode between human brain neurons, the NPU can quickly process input information, and can further perform continuous self-learning. The NPU can implement applications such as intelligent cognition of the HMD 300, for example, image recognition, face recognition, voice recognition, and text understanding.

The HMD 300 can implement a display function through the GPU, the display screen 301, the application processor, and the like. The GPU is an image processing microprocessor, which is connected to the display screen 301 and the application processor. The GPU is configured to perform mathematical and geometric calculations and is used for graphics rendering. The processor 302 may include one or more GPUs that execute program instructions to generate or change display information.

The HMD 300 can further implement a photographing function through the ISP, the camera, the video codec, the GPU, the display screen 301, the application processor, and the like.

The memory 303 may be configured to store application program code, for example, application program code used to separately control display occasion and display duration of the left display screen and the right display screen, or used to generate image data, audio data, and the like of augmented reality/virtual reality/mixed reality. The memory 303 may include a program storage area and a data storage area. The program storage area may store an operating system, an application program required by at least one function (such as a voice playing function and an image playing function), and the like. The data storage area may store data (such as audio data and an address book) created in a process of using the HMD 300, and the like. In addition, the memory 303 may include a high-speed random access memory, and may further include a non-volatile memory, such as at least one magnetic disk storage device, flash memory device, and universal flash storage (universal flash storage, UFS).

The sensor module 304 may include inertial sensors such as an acceleration sensor, a gyroscope, and a geomagnetic sensor, and may be configured to capture head movements. The sensor module 304 may further include a motion capture sensor, such as a depth sensor, a gyroscope, an accelerometer, a magnetometer, a proximity sensor, an infrared camera, an infrared sensor, and the like. The sensor module 304 may be configured to capture the movement of the user to the left, right, front, or back, the movement of putting out a hand, the movement of waving a hand, the movement of grasping, and so on. In addition, the camera, the infrared sensor, and the like can further track an eyeball of the user. The sensor module 304 may further include another type of sensor, for example, an optical proximity sensor for wear detection, a capacitive sensor for a touch panel, an ambient light sensor, and a sound detector.

The optical proximity sensor may include, for example, a light-emitting diode (LED) and a light detector, for example, a photodiode. The light-emitting diode may be an infrared light-emitting diode. The HMD 300 emits infrared light by using the light-emitting diode. The HMD 300 detects infrared reflected light of a nearby object by using the photodiode. When sufficient reflected light is detected, it may be determined that there is an object near the HMD 300. When insufficient reflected light is detected, the HMD 300 may determine that there is no object near the HMD 300. The HMD 300 may detect a gesture operation at a specific position of the HMD 300 by using the optical proximity sensor, so as to achieve a purpose of associating the gesture operation with an operation command.

The distance sensor is configured to measure a distance. The HMD 300 can measure a distance by using infrared or a laser. In some embodiments, the HMD 300 may use the distance sensor to measure a distance, so as to achieve fast focusing.

The gyroscope sensor can be configured to determine a movement posture of the HMD 300. In some embodiments, the gyroscope sensor can be configured to determine angular velocities of the HMD 300 around three axes (that is, x, y, and z axes). The gyroscope sensor may further be used for navigation and somatosensory game scenes.

The ambient light sensor is configured to sense brightness of ambient light. The HMD 300 can adaptively adjust brightness of the display screen 301 based on the sensed brightness of the ambient light. The ambient light sensor can be further configured to automatically adjust white balance during photographing.

The acceleration sensor can detect magnitudes of acceleration of the HMD 300 in various directions (generally three axes). When the HMD 300 is still, a value and a direction of gravity may be detected. The acceleration sensor can be further configured to identify the posture of the HMD, and be used in an application such as a pedometer.

The temperature sensor is configured to detect a temperature. In some embodiments, the HMD 300 executes a temperature processing policy by using the temperature detected by the temperature sensor. For example, when the temperature reported by the temperature sensor exceeds a threshold, the HMD 300 degrades performance of a processor located near the temperature sensor, so as to reduce power consumption and implement thermal protection. In some other embodiments, when the temperature is lower than another threshold, the HMD 300 heats the battery to avoid abnormal shutdown of the HMD 300 caused by a low temperature. In some other embodiments, when the temperature is lower than still another threshold, the HMD 300 boosts an output voltage of the battery to avoid abnormal shutdown caused by a low temperature.

The camera 305 may be mounted on a side of the HMD 300, or may alternatively be mounted at a position on the HMD 300 between two display screens. The camera 305 may be configured to capture an image and a video in the user's field of view in real time. The HMD 300 generates a virtual image based on the captured real-time image and video, and displays the virtual image through the display screen 301.

The processor 302 may determine, based on the still image or the video image captured by the camera 305 and in combination with data (for example, data such as brightness and sound) obtained by the sensor module 304, the virtual image to be displayed on the display screen 301, so as to superimpose the virtual image on a real-world object.

The digital signal processor is configured to process a digital signal. In addition to processing a digital image signal, the digital signal processor can further process another digital signal. For example, when the HMD 300 selects a frequency, the digital signal processor is configured to perform Fourier transform or the like on a frequency signal.

The video codec is configured to compress or decompress a digital video. The HMD 300 can support one or more video codecs. In this way, the HMD 300 can play or record videos in a plurality of encoding formats, such as moving picture experts group (moving picture experts group, MPEG)-1, MPEG-2, MPEG-3, and MPEG-4.

In some embodiments, the HMD 300 may implement eye tracking (eye tracking). For example, an infrared device (such as an infrared emitter) and an image acquisition device (such as a camera 305) may be configured to detect an eyeball gaze direction.

In addition, the HMD 300 may further have a wireless communication function. The communications module 306 may include a wireless communications module and a mobile communications module. The wireless communication function may be implemented by using an antenna (not shown), a mobile communications module (not shown), a modem processor (not shown), a baseband processor (not shown), and the like.

The antenna is configured to transmit and receive electromagnetic wave signals. The HMD 300 may include a plurality of antennas. Each antenna may be configured to cover one or more communication frequency bands. Different antennas may be further multiplexed to improve antenna utilization. For example, an antenna 1 may be multiplexed as a diversity antenna of a wireless local area network. In some other embodiments, the antenna may be used in combination with a tuning switch.

The mobile communications module can provide a wireless communication solution including 2G/3G/4G/5G and the like applied to the HMD 300. The mobile communications module may include at least one filter, at least one switch, at least one power amplifier, at least one low noise amplifier (low noise amplifier, LNA), and the like. The mobile communications module can receive an electromagnetic wave through the antenna, perform processing such as filtering and amplifying on the received electromagnetic wave, and transmit the processed electromagnetic wave to the modem processor for demodulation. The mobile communications module can further amplify a signal that is modulated by the modem processor, and the signal is converted into an electromagnetic wave and radiated by the antenna. In some embodiments, at least some functional modules of the mobile communications module may be arranged in the processor 302. In some embodiments, at least some functional modules of the mobile communications module and at least some modules of the processor 302 may be arranged in a same device. In some embodiments, the HMD 300 may obtain image data, audio data, and the like of augmented reality/virtual reality/mixed reality from an external device by using the mobile communications module.

The modem processor may include a modulator and a demodulator. The modulator is configured to modulate a to-be-sent low frequency baseband signal into a medium and high frequency signal. The demodulator is configured to demodulate the received electromagnetic wave signal into a low frequency baseband signal. Subsequently, the demodulator transmits the low frequency baseband signal obtained through demodulation to the baseband processor for processing. After being processed by the baseband processor, the low frequency baseband signal is transferred to the application processor. The application processor outputs a sound signal by using an audio device (not limited to a speaker or the like), or displays an image or a video by using a display screen 301. In some embodiments, the modem processor may be a standalone device. In some other embodiments, the modem processor may be independent of the processor 302, and arranged in a same device as the mobile communications module or another functional module.

The wireless communications module can provide wireless communication solutions including a wireless local area network (wireless local area networks, WLAN) (such as a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), infrared (infrared, IR) and the like that are applied to the HMD 300. The wireless communications module may be one or more devices integrating at least one communication processing module. The wireless communications module receives an electromagnetic wave through the antenna, performs processing of frequency modulation and filtering on the electromagnetic wave signal, and sends the processed signal to the processor 302. The wireless communications module can further receive a to-be-sent signal from the processor 302, and perform frequency modulation and amplification on the signal. The signal is converted into an electromagnetic wave and radiated by the antenna. In some embodiments, the HMD 300 may obtain image data, audio data, and the like of augmented reality/virtual reality/mixed reality from an external device by using the wireless communications module.

In some embodiments, the antenna of the HMD 300 is coupled to the mobile communications module, so that the HMD 300 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies. The GNSS may include a global positioning system (global positioning system, GPS), a global navigation satellite system (global navigation satellite system, GLONASS), and a Beidou navigation satellite system (beidou navigation satellite system, BDS), a quasi-zenith satellite system (quasi-zenith satellite system, QZSS), and/or a satellite based augmentation system (satellite based augmentation systems, SBAS).

The HMD 300 may implement an audio function by using a speaker 307, a microphone 308, an audio module, an earphone jack, an application processor, and the like, for example, music playing and recording.

The audio module is configured to convert digital audio information into an analog audio signal for output, and is further configured to convert an analog audio input into a digital audio signal. The audio module can be further configured to encode and decode audio signals. In some embodiments, the audio module may be arranged in the processor 302, or some of the functional modules of the audio module may be arranged in the processor 302.

The speaker 307, also referred to as a "horn" or "telephone receiver", is configured to convert an audio electrical signal into a sound signal. The HMD 300 can listen to music through the speaker, or listen to a hands-free call.

The microphone 308, also referred to as a "mike", is configured to convert a sound signal into an electrical signal. The HMD 300 may be provided with at least one microphone 308. In some other embodiments, the HMD 300 may be provided with two microphones 308, which can implement a noise reduction function in addition to collecting sound signals. In some other embodiments, the HMD 300 may alternatively be provided with three, four, or more microphones 308 to implement sound signal collection, noise reduction, sound source recognition, directional recording, and the like functions.

The earphone jack is configured to connect a wired earphone. The earphone jack may be a USB interface, or may be a 3.5 mm open mobile HMD platform (open mobile terminal platform, OMTP) standard interface, or a cellular telecommunications industry association of the USA (cellular telecommunications industry association of the USA, CTIA) standard interface.

In some embodiments, the HMD 300 may include a sound detector. The sound detector can detect and process a voice signal used to control a portable electronic device. For example, the sound detector may include a microphone 308, so that the HMD 300 may use the microphone 308 to convert a sound into an electrical signal. The sound detector may subsequently process the electrical signal and recognize the signal as a command of the HMD 300. The processor 302 may be configured to receive a voice signal from the microphone 308. After receiving the voice signal, the processor 302 may run the sound detector to recognize a voice command. For example, when receiving a voice instruction, the HMD 300 may obtain a contact in a stored user contact list, so that the HMD 300 can automatically dial a phone number of the contact.

The power supply 309 is configured to supply power to components included in the HMD 300, for example, supply power to the left display screen 3011 and the right display screen 3012. In some embodiments, the power supply 309 may include a battery, such as a rechargeable battery.

The HMD 300 may further include an input/output interface 310, which may connect another apparatus to the HMD 300 through an appropriate component. The component may include, for example, an audio/video jack, and a data connector. In some embodiments, after the HMD 300 is electrically connected to another electronic device (for example, a mobile phone or a computer) through the input/output interface 310, the another electronic device may supply power to the power supply 309 of the HMD 300. In some other embodiments, after the HMD 300 is electrically connected to another electronic device (for example, a mobile phone or a computer) through the input/output interface 310, the HMD 300 may further obtain image data, audio data, and the like of augmented reality/virtual reality/mixed reality from the another electronic device. The input/output interface 310 may further connect another apparatus to the HMD 300 through an appropriate component. For example, the component may include an audio/video jack, a data connector, and the like.

In some embodiments, the HMD 300 may further include one or more keys 311. These keys can control the HMD and provide a user with a function of accessing the HMD 300. The keys may take the form of buttons, switches, dials, and touch or near touch sensing devices (for example, touch sensors). For example, the user may open the display screen 301 of the HMD 300 by pressing a button. The keys may include a power-on key, a volume key, and the like. The key may be a physical key, or a touch key. The HMD 300 can receive a key input, and generate a key signal input related to user setting and function control of the HMD 300.

Figure 4:
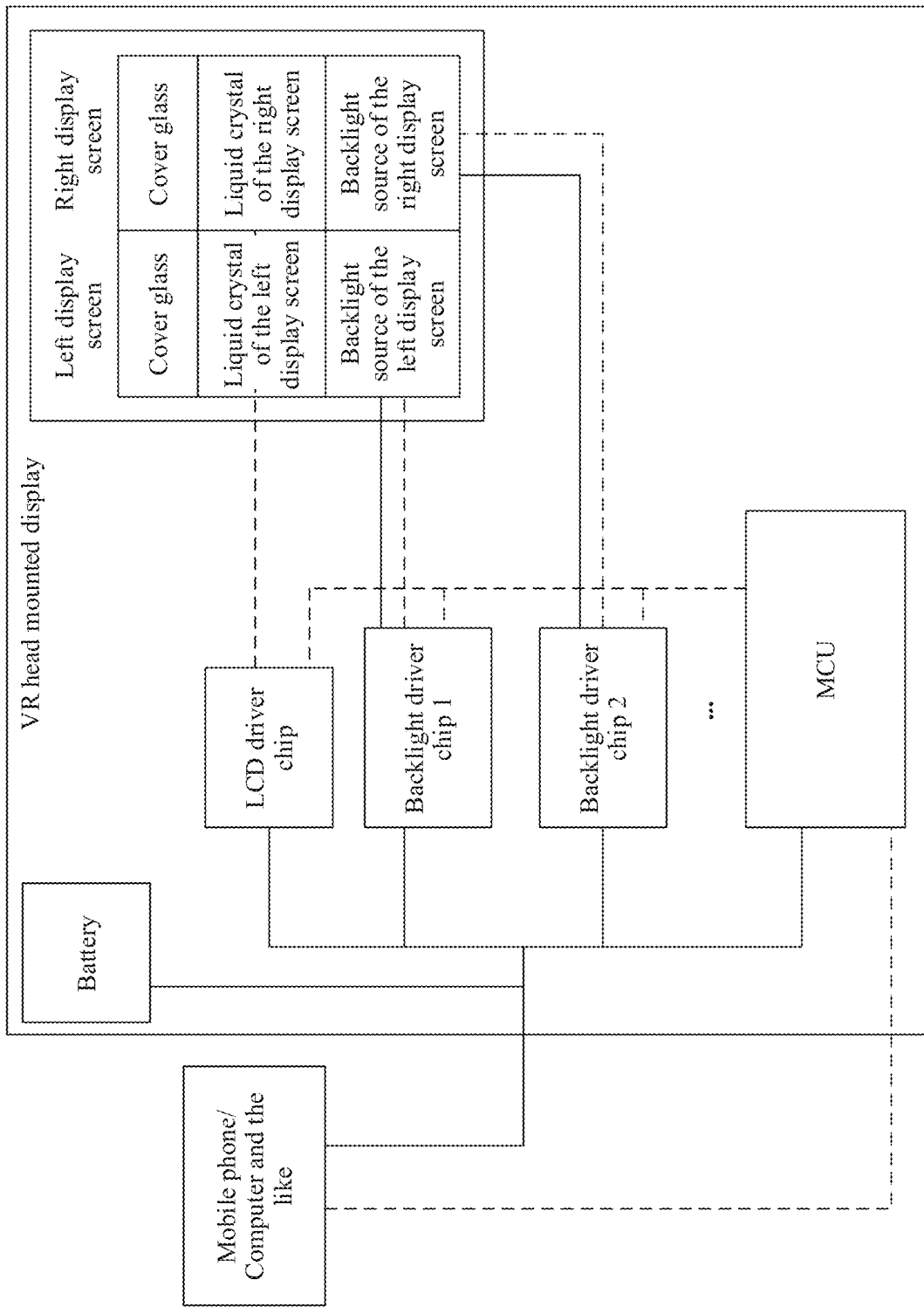
FIG. 4 is a schematic diagram of a current power supply relationship according to an embodiment of this application.

When the electronic device is the HMD 300 shown in FIG. 3, staggering display times of the left display screen 3011 and the right display screen 3012 of the HMD 300 may reduce the peak current of the HMD 300. For example, when the display screen 301 of the HMD 300 is an LCD display screen, and the processor 302 is an MCU, a dashed line in FIG. 4 shows an interaction relationship between an internal control instruction and data information of the HMD 300, and a solid line in FIG. 4 shows a current power supply relationship. The LCD display screen may include components such as a liquid crystal of the left display screen 3011, a liquid crystal of the right display screen 3012, a backlight source of the left display screen 3011, a backlight source of the right display screen 3012, and cover glass.

When the display screen 301 of the HMD 300 is an LCD display screen, the HMD 300 may include components such as an LCD driver chip that is configured to drive the liquid crystal of the left display screen 3011 and the liquid crystal of the right display screen 3012, a backlight module 1, and a backlight module 2. The backlight module 1 may include a backlight driver chip 1 and the backlight source of the left display screen 3011. The backlight driver chip 1 is configured to drive the backlight source of the left display screen 3011 to light up, and supply power to the backlight source of the left display screen 3011 when the backlight source of the left display screen 3011 lights up. The backlight module 2 may include a backlight driver chip 2 and the backlight source of the right display screen 3012. The backlight driver chip 2 is configured to drive the backlight source of the right display screen 3012 to light up, and supply power to the backlight source of the right display screen 3012 when the backlight source of the right display screen 3012 lights up.

It can be seen from FIG. 4 that the power supply current of the HMD 300 may come from a battery of the HMD 300 and/or an external electronic device such as a mobile phone or a computer. The power supply current of the HMD 300 may supply power to components such as the LCD driver chip, the backlight module 1, the backlight module 2, and the MCU. A power supply current required for normal operation of the LCD driver chip and the MCU is quite small. When the backlight source of the left display screen 3011 does not light up, a power supply current required by the backlight driver chip 1 in the backlight module 1 is relatively small. When the backlight source of the left display screen 3011 lights up to display a left-eye image, a current provided by the backlight driver chip 1 for the backlight source of the left display screen 3011 is relatively large, that is, a power supply current required by the backlight module 1 is relatively large. Similarly, when the backlight source of the right display screen 3012 does not light up, a power supply current required by the backlight driver chip 2 in the backlight module 2 is relatively small. When the backlight source of the right display screen 3012 lights up to display a right-eye image, a current provided by the backlight driver chip 2 for the backlight source of the right display screen 3012 is relatively large, that is, a power supply current required by the backlight module 2 is relatively large.

In other words, the peak current of the HMD 300 is mainly affected by the power supply currents of the backlight source of the left display screen 3011 and the backlight source of the right display screen 3012, that is, mainly affected by the power supply currents of the backlight module 1 and the backlight module 2. The MCU may control the display time of the left display screen 3011 and the display time of the right display screen 3012 to be staggered, so as to control the power supply time of the backlight source of the left display screen 3011 and the backlight source of the right display screen 3012 to be staggered, and reduce the peak current of the HMD 300. For example, the MCU may separately control, by using different timers or counters (which, for example, may be implemented by using registers), a time at which the backlight driver chip 1 drives the backlight source of the left display screen 3011 to light up and a time at which the backlight driver chip 2 drives the backlight source of the right display screen 3012 to light up, so that power supply times of the backlight source of the left display screen 3011 and the backlight source of the right display screen 3012 are staggered.

The MCU obtains image data from an external electronic device such as a mobile phone or a computer, or generates image data by itself, and writes the image data into the LCD driver chip. The MCU controls the LCD driver chip to drive the liquid crystal flipping according to the image data. The MCU controls the backlight driver chip 1 to be the backlight source of the left display screen 3011 at a corresponding occasion, so as to light up the backlight source of the left display screen 3011, and display the left-eye image. In addition, the MCU controls the backlight driver chip 2 to be the backlight source of the left display screen 3011 at a corresponding occasion, so as to light up the backlight source of the right display screen 3012, and display the right-eye image.

When the left display screen 3011 does not display an image, the backlight source of the left display screen 3011 is not powered, and the backlight source of the left display screen 3011 does not light up. The backlight driver chip 1 may be in a powered state or may be in an unpowered state. The liquid crystal of the left display screen 3011 may or may not be flipped. The liquid crystal of the right display screen 3012 may or may not be flipped. When the left display screen 3011 displays the left-eye image, the liquid crystal of the left display screen 3011 is flipped. The backlight driver chip 1 is powered. The backlight source of the left display screen 3011 is powered, and the backlight source of the left display screen 3011 lights up. The liquid crystal of the right display screen 3012 may or may not be flipped.

When the right display screen 3012 does not display an image, the backlight source of the right display screen 3012 is not powered, and the backlight source of the right display screen 3012 does not light up. The backlight driver chip 2 may be in a powered state or may be in an unpowered state. The liquid crystal of the right display screen 3012 may or may not be flipped. The liquid crystal of the left display screen 3011 may or may not be flipped. When the right display screen 3012 displays the right-eye image, the liquid crystal of the right display screen 3012 is flipped. The backlight driver chip 2 is powered. The backlight source of the right display screen 3012 is powered, and the backlight source of the right display screen 3012 lights up. The liquid crystal of the left display screen 3011 may or may not be flipped.

It should be noted that, FIG. 4 uses an example in which the HMD 300 is an LCD display screen for description. When the HMD 300 is a MicroLED display screen or an OLED display screen, the HMD 300 may include a display driver module 1 configured to drive the left display screen 3011 to display the left-eye image, and a display driver module 2 configured to drive the right display screen 3012 to display the right-eye image. The peak current of the HMD 300 is mainly affected by power supply currents of the display driver module 1 and the display driver module 2. By controlling the display time of the left display screen 3011 and the display time of the right display screen 3012 to be staggered, the MCU can control the power supply times of the display driver module 1 and the display driver module 2 to be staggered, thereby reducing the peak current of the HMD 300.

The following describes the display method provided in this embodiment of this application by using an example in which the electronic device is the HMD shown in FIG. 3 and FIG. 4, and the HMD includes a left display screen and a right display screen.

Figure 5C:
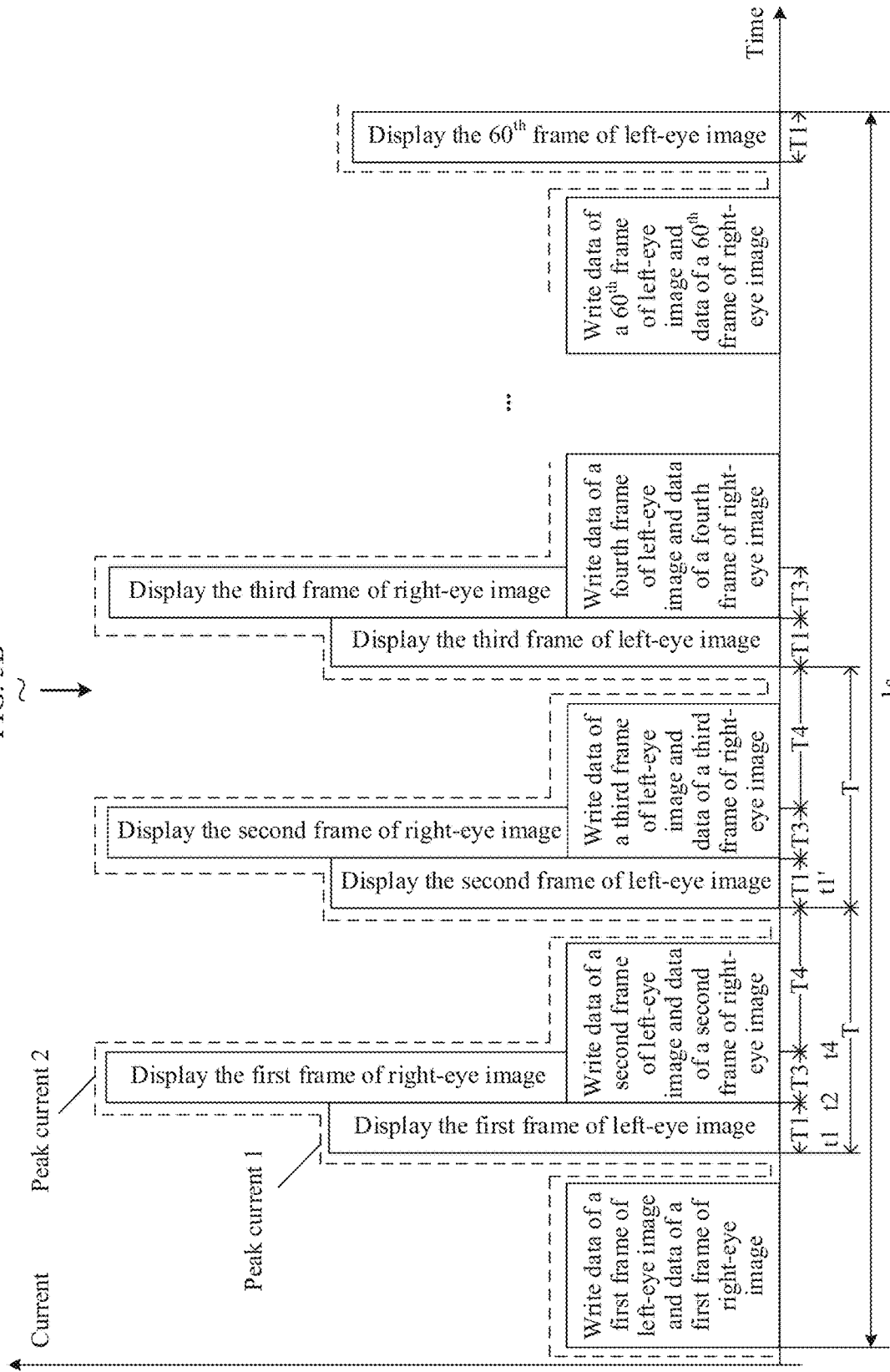
FIG. 5C is a schematic diagram of another correspondence between an image display time and a current according to an embodiment of this application.

FIG. 5A to FIG. 5C are schematic diagrams of a display method according to an embodiment of this application. As shown in FIG. 5A to FIG. 5C, when the user uses the HMD, the HMD may separately obtain the first frame of left-eye image and the first frame of right-eye image.

For the split-type HMD, the image data sent by the external device may be received by using a wired connection or a wireless connection to the external device such as a computer or a mobile phone according to a preset display frame rate f. For example, in some embodiments, the HMD may separately receive data of the first frame of left-eye image (that is, the first frame of left-eye image) and data of the first frame of right-eye image (that is, the first frame of right-eye image) that are sent by the external device. In some other embodiments, the HMD may receive first image data sent by the external device, and separately obtain the data of the first frame of left-eye image and the data of the first frame of right-eye image from the first image data. For the integrated HMD, data of each frame of left-eye image and data of each frame of right-eye image may be generated by using a processor of the integrated HMD according to a preset display frame rate f. For the mobile-end HMD, data of each frame of left-eye image and data of each frame of right-eye image may be generated by using a mobile device in the HMD according to a preset display frame rate f.

As shown in FIG. 5C, after obtaining the data of the first frame of left-eye image, the HMD may write the data of the first frame of left-eye image into a buffer. After obtaining the data of the first frame of right-eye image, the HMD may write the data of the first frame of right-eye image into a buffer.

Figure 6:
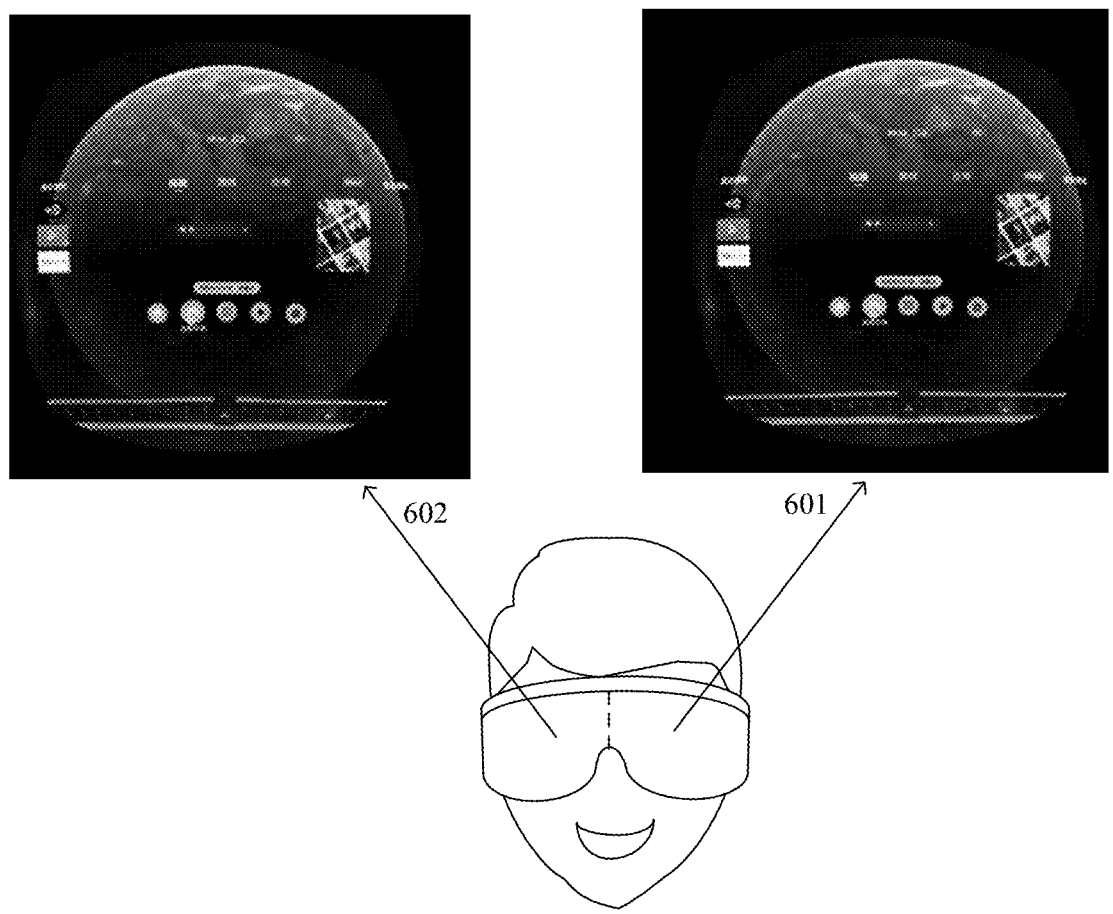
FIG. 6 is a schematic diagram of a left-eye image and a right-eye image according to an embodiment of this application.

As shown in FIG. 5C, at a moment t1, the HMD may display the first frame of left-eye image on the left display screen. When the HMD displays the first frame of left-eye image on the left display screen, the HMD does not display an image on the right display screen, and the HMD may supply power only for displaying the image on the left display screen. For example, the first frame of left-eye image may be an image 601 in FIG. 6.

In duration T1 between the moment t1 and a moment t2, the HMD continuously displays the first frame of left-eye image on the left display screen. At the moment t2, the HMD stops displaying the first frame of left-eye image on the left display screen. T1 is preset duration, for example, may be 2 ms. In an embodiment, as shown in FIG. 5C, after the moment t2, the HMD may immediately display the first frame of right-eye image on the right display screen, thereby minimizing a probability that a user perceives asynchronous displaying of the left-eye image and the right-eye image, screen flickering, or incompliance with an actual situation, or feels uncomfortable, for example, dizzy.

Figure 7:
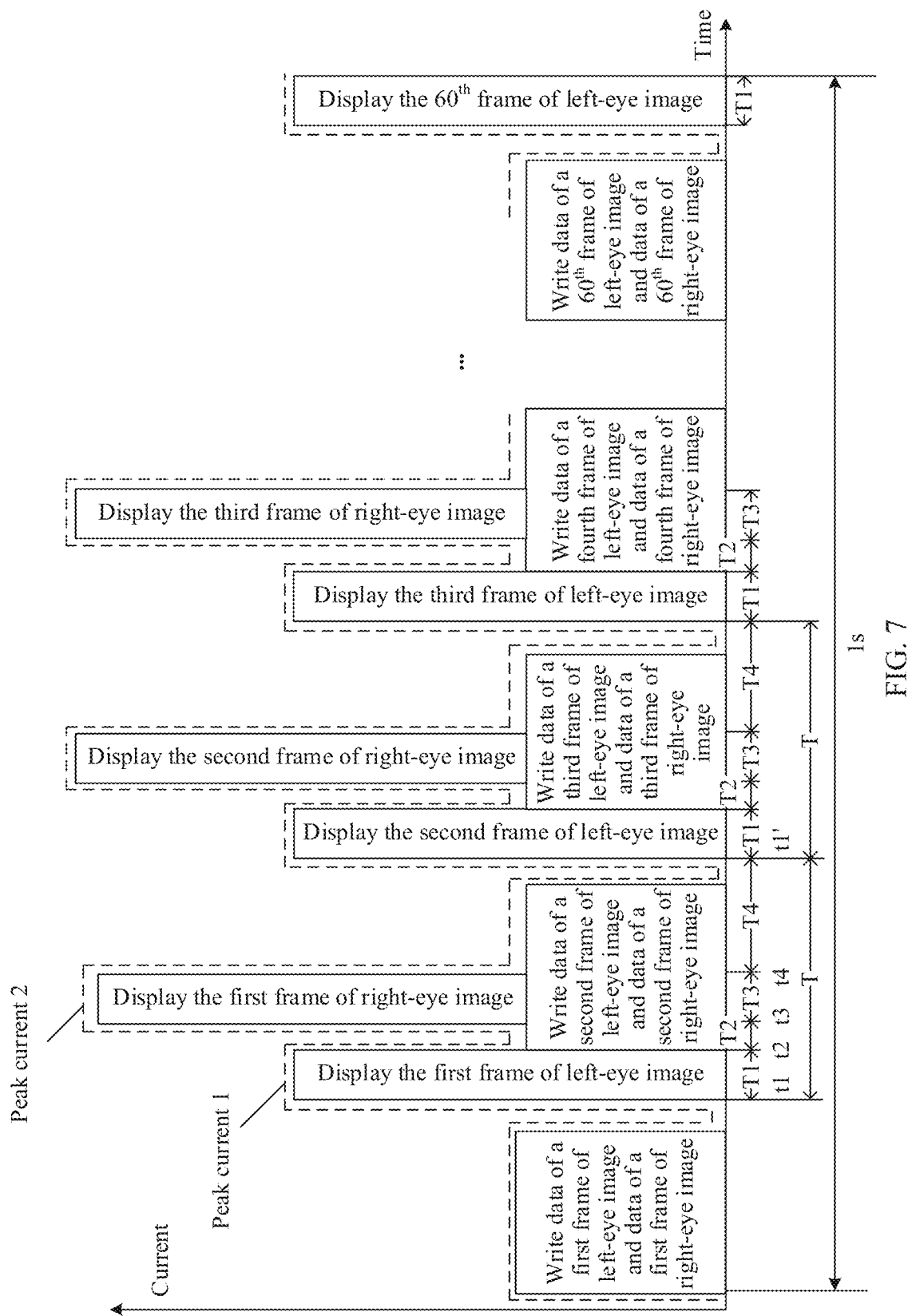
FIG. 7 is a schematic diagram of another correspondence between an image display time and a current according to an embodiment of this application.

In another embodiment, referring to FIG. 7, after the moment t2, at a moment t3 that is spaced by duration T2 from the moment t2, the HMD may display the first frame of right-eye image on the right display screen. T2 is preset duration, and is generally short, for example, may be less than or equal to 2 ms. When the first frame of left-eye image and the first frame of right-eye image are displayed at an interval of the duration T2, it is not easy for the user to perceive asynchronous displaying of the left-eye image and the right-eye image, screen flickering, incompliance with an actual situation, or the like, and discomfort such as dizziness is avoided for the user as much as possible. For example, the first frame of right-eye image may be an image 602 in FIG. 6. Through comparison between the image 601 seen by the left eye of the user and the image 602 seen by the right eye of the user, it can be learned that a field of view of the image seen by the left eye is different from a field of view of the image not seen by the right eye.

At a moment t4 after the first frame of right-eye image is continuously displayed for duration T3, that is, at a moment t4 after the moment t2, the HMD may stop displaying the first frame of right-eye image. T3 is preset duration, for example, may be 2 ms. The HMD then does not display images on either the left display screen or the right display screen. T3 and T1 may be the same or different. That is, a time for continuously displaying the first frame of left-eye image by the HMD and a time for continuously displaying the first frame of right-eye image by the HMD may be the same or different.

In this way, the HMD starts to display the first frame of right-eye image only after the displaying of the first frame of left-eye image is stopped. In other words, the display times of the first frame of left-eye image and the first frame of right-eye image are staggered; or the display times of the first frame of left-eye image and the first frame of right-eye image do not overlap/coincide/cross. The HMD only needs to supply power to the image display of the left display screen or the image display of the right display screen at a same moment, so that the peak current of the HMD can be reduced.

Then, the HMD may separately obtain data of a second frame of left-eye image and data of a second frame of right-eye image, and write the data into a display buffer.

Figure 8:
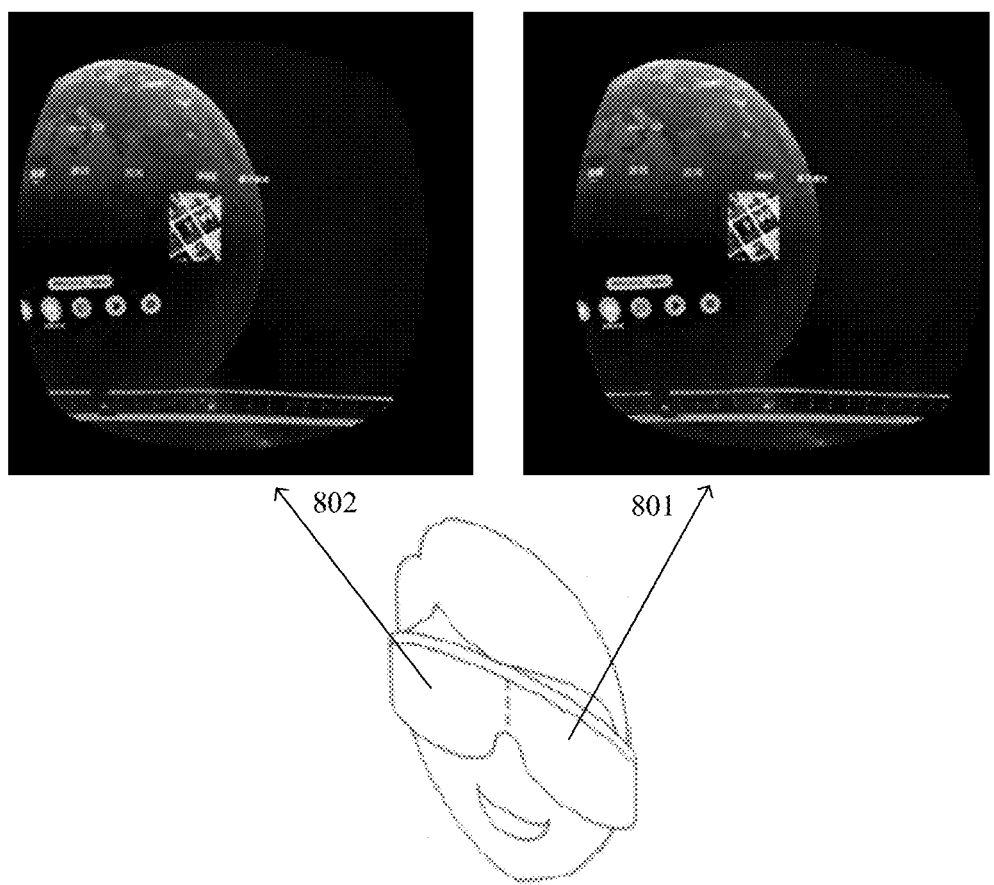
FIG. 8 is another schematic diagram of a left-eye image and a right-eye image according to an embodiment of this application.

It should be noted that, in this embodiment of this application, pictures of different frames of images vary with progress of a use process of the user (for example, progress of a game) and movements of a head, an eyeball, a hand, and the like of the user. For example, after the HMD displays the first frame of left-eye image and the first frame of right-eye image, as shown in FIG. 8, if the user slightly turns the head to the right, a field of view of a person simulated by the HMD changes with the head turning of the user. That is, in response to the head turning movement of the user, the second frame of left-eye image and the second frame of right-eye image obtained by the HMD change accordingly.

At a moment t1' that is spaced by duration T4 from the moment t4, that is, at a moment t1' that is spaced by duration T from the moment t1, the HMD may display the second frame of left-eye image on the left display screen. T4 may be preset duration. In other words, the display times of the first frame of right-eye image and the second frame of left-eye image are also staggered. Within duration of the first display cycle T, the HMD may stagger the displaying of the first frame of left-eye image and the first frame of right-eye image. In addition, the display times of the first frame of right-eye image and the second frame of left-eye image are spaced by duration T4, that is, two adjacent frames of images are displayed at an interval of a time period, thereby avoiding problems such as smearing and blurring caused by an afterglow effect of human eyes, and improving user experience.

Then, similar to the case in the first display cycle T, in the second display cycle T, that is, within the duration T after the moment t1', as shown in FIG. 5C or FIG. 7, the HMD may stagger the displaying of the second frame of left-eye image and the second frame of right-eye image according to the foregoing intervals T1, T3, T4, or T2 at a display occasion similar to that of the first frame of left-eye image and the first frame of right-eye image, thereby reducing the peak current of the HMD. For example, the second frame of left-eye image may be an image 801 in FIG. 8, and the second frame of right-eye image may be an image 802 in FIG. 8.

Figure 9:
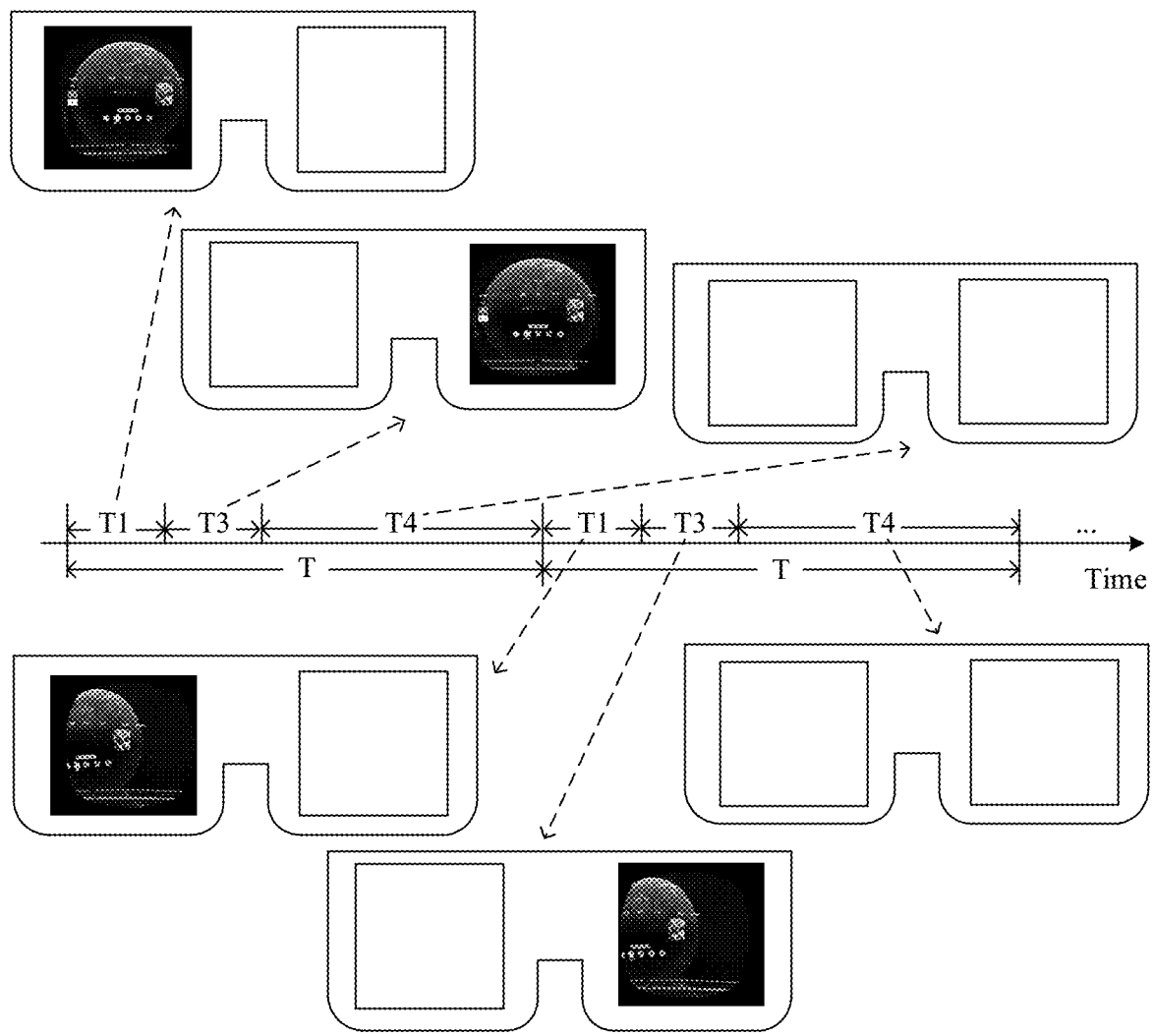
FIG. 9 is a display time sequence diagram according to an embodiment of this application.

For example, when the display process shown in FIG. 5C is used, for a display effect of the HMD, refer to FIG. 9.

Then, similar to the case in the first display cycle T, in a subsequent display cycle T, the HMD may stagger the displaying of the subsequent frame of left-eye image and the subsequent frame of right-eye image according to the foregoing intervals T1, T3, T4, or T2 at a display occasion similar to that of the first frame of left-eye image and the first frame of right-eye image.

The sum of T1 and T3 is less than the display cycle T. When T2 exists, the sum of T1, T2, and T3 is less than T. In other words, the HMD may separately display one frame of left-eye image and one frame of right-eye image in each display cycle T according to the preset display frame rate f. In addition, in each display cycle T, there is a time period in which neither the left display screen nor the right display screen displays an image. The time period may include T4 in FIG. 5C, or include T2 and T4 in FIG. 7. In this way, the HMD may cause the display times of the left display screen and the right display screen to be staggered. The sum of T1, T3, and T4 may be equal to T. When T2 exists, the sum of T1, T2, T3, and T4 may be equal to T.

In this way, for each frame of image of the HMD, the display times of the left-eye image and the right-eye image may be staggered. For two adjacent frames of images, the display times of the previous frame of right-eye image and the next frame of left-eye image may also be staggered. Therefore, the HMD only needs to provide a current for image display of the left display screen or the right display screen at a same moment, so as to support the left display screen in displaying the left-eye image or support the right display screen in displaying the right-eye image, thereby reducing the peak current of the HMD.

Figure 10:
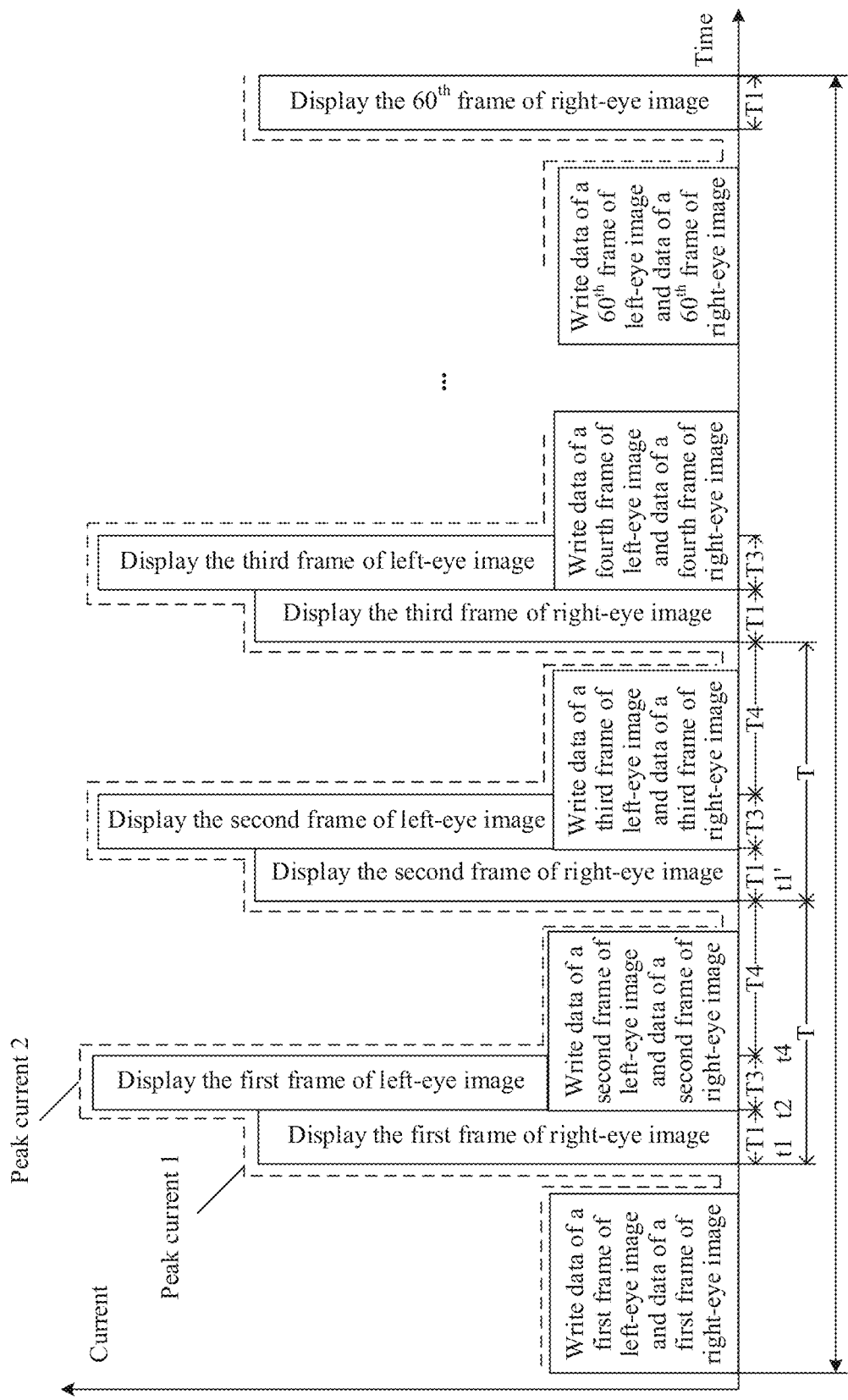
FIG. 10 is a schematic diagram of another correspondence between an image display time and a current according to an embodiment of this application.
Figure 11:
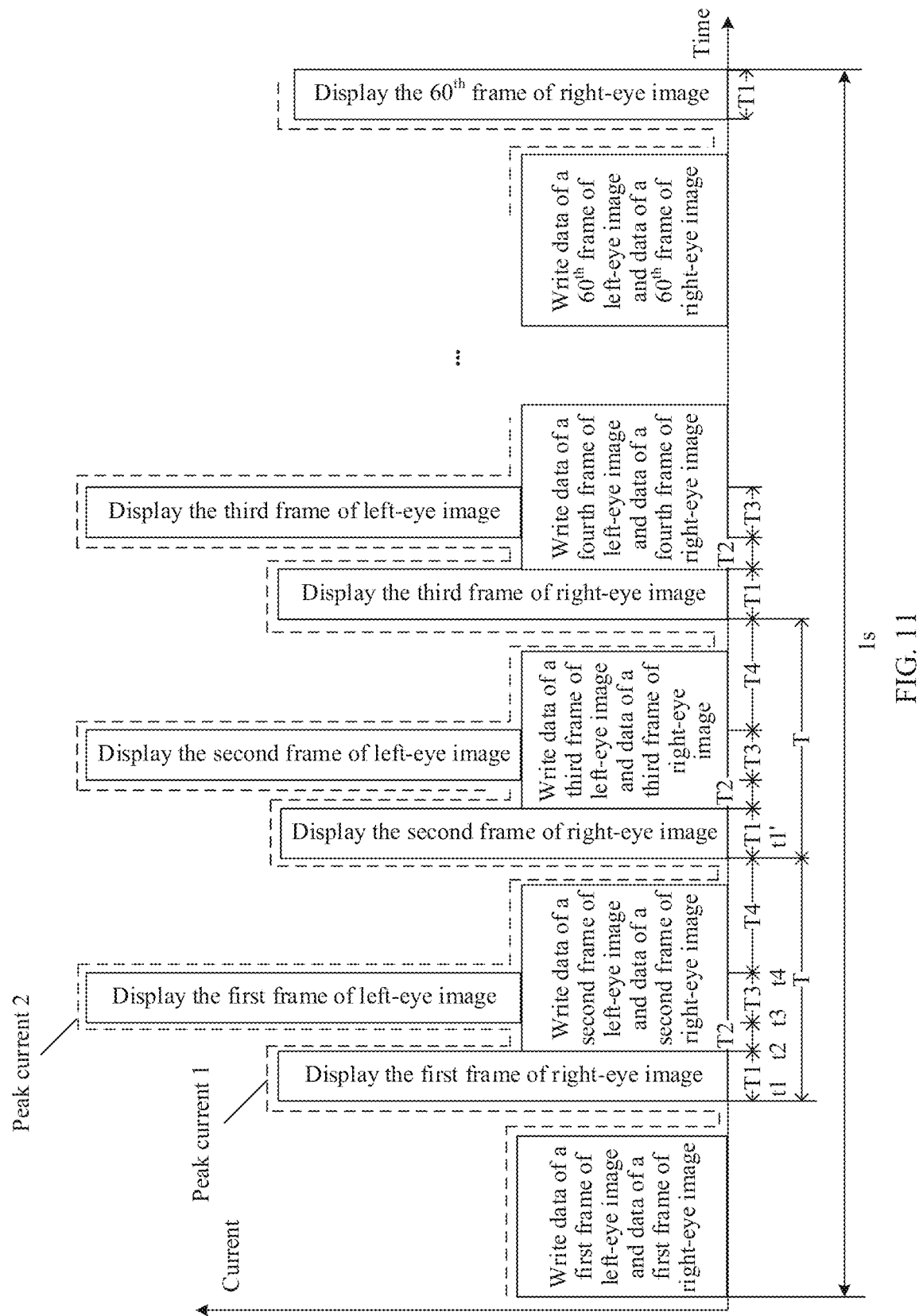
FIG. 11 is a schematic diagram of another correspondence between an image display time and a current according to an embodiment of this application.

The foregoing embodiment is described by using an example in which the left-eye image is first displayed and then the right-eye image is displayed in each display cycle T. In another embodiment, the display occasions of the left-eye image and the right-eye image described in the foregoing embodiment may be interchanged. That is, referring to FIG. 10 or FIG. 11, the HMD may alternatively display the right-eye image first and then display the left-eye image in each display cycle T.

In this way, in each display cycle of the HMD, the display times of the right-eye image and the left-eye image may be staggered. In addition, the display times of the previous frame of left-eye image and the next frame of right-eye image may also be staggered. Therefore, the HMD only needs to provide a current for image display of the right display screen or the left display screen at a same moment, so as to support the right display screen in displaying the right-eye image or support the left display screen in displaying the left-eye image, thereby reducing the peak current of the HMD.

In addition, it can be seen from a current curve represented by a dashed line envelope in FIG. 5C, FIG. 7, FIG. 10, or FIG. 11 that the power supply current of the HMD may have two peak currents in one display cycle T, that is, respectively corresponding to a time period in which the left display screen displays the left-eye image and a time period in which the right display screen displays the right-eye image. In addition, through comparison between the current curve represented by the dashed line envelope in FIG. 5C, FIG. 7, FIG. 10, or FIG. 11 and a current curve represented by a dashed line envelope in FIG. 1, it can be learned that according to the display solution provided in this embodiment of this application, the peak current of the HMD can be significantly reduced.

Figure 12:
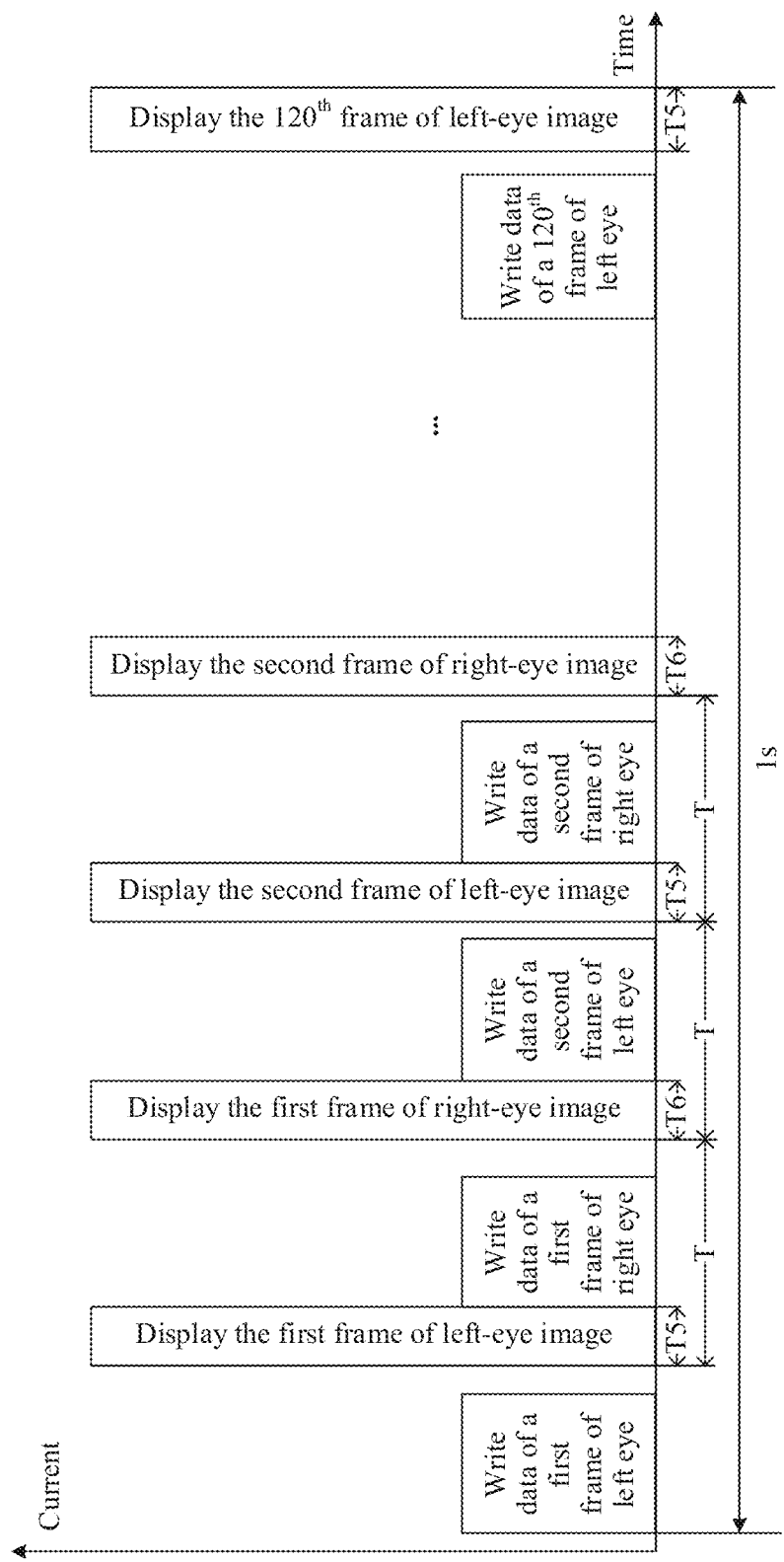
FIG. 12 is a schematic diagram of another correspondence between an image display time and a current according to an embodiment of this application.

The foregoing description is given by using an example in which displaying of the left-eye image and displaying of the right-eye image are staggered in one display cycle T. In another embodiment, the HMD may alternately display the left-eye image and the right-eye image in different display cycles T according to a preset display frame rate f. For example, referring to FIG. 12, the display frame rate f is 120 fps, and the HMD may sequentially perform displaying according to the following order: displaying the first frame of left-eye image on the left display screen in the first display cycle T; displaying the second frame of right-eye image on the right display screen in the second display cycle T; displaying a third frame of left-eye image on the left display screen in the third display cycle T; . . . ; displaying a $120^{th}$ frame of right-eye image on the right display screen in a $120^{th}$ display cycle T. Display duration T5 of the left-eye image and display duration T6 of the right-eye image shown in FIG. 12 may be the same or different. In addition, a time difference between a moment at which displaying of an $i^{th}$ (i is a positive integer) frame of image is stopped and a moment at which an $(i+1)^{th}$ frame of image starts to be displayed may be the foregoing T2, so that it is not easy for the user to perceive asynchronous displaying of the left-eye image and the right-eye image, screen flickering, incompliance with an actual situation, or the like, and discomfort such as dizziness is avoided for the user as much as possible.

Figure 13:
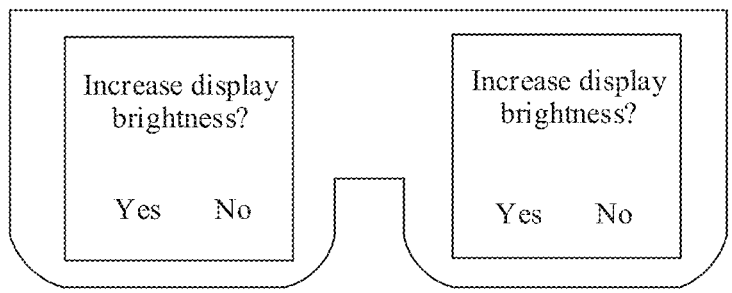
FIG. 13 is a schematic diagram of a prompt according to an embodiment of this application.

In some other embodiments, when determining that the peak current is less than the rated current, the HMD may prompt, by using a voice, vibration, display prompt information shown in FIG. 13, or the like, the user whether to increase display brightness. After detecting an operation that the user chooses to increase the display brightness, the HMD may increase the power supply current of the display screen, so as to increase the display brightness of the display screen, and ensure that the peak current of the HMD is still less than the rated current.

Figure 14:
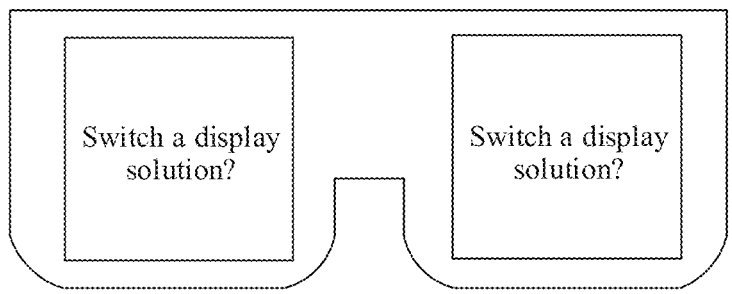
FIG. 14 is a schematic diagram of another prompt according to an embodiment of this application.

In some other embodiments, the HMD may switch between different display solutions. For example, by default, the HMD may perform displaying by using the solution shown in FIG. 2. When the peak current is greater than the rated current, the HMD may prompt, by using a voice, vibration, display prompt information shown in FIG. 14, or the like, the user whether to switch the display solution. After detecting an operation that the user chooses to switch the display solution, the HMD may display an image by using the display solution for reducing the peak current provided in this embodiment of this application. For another example, after the HMD is powered on for the first time or each time, the user may select a to-be-used display solution by using a voice, a gesture operation, or the like, and the HMD uses a corresponding solution (for example, the display solution shown in FIG. 2, FIG. 5C, FIG. 7, FIG. 10, FIG. 11, or FIG. 12) for image display according to the selection of the user.

In addition, the foregoing description is given by using an example in which the electronic device is an HMD. When the electronic device is another device that includes two display screens, the another device can also reduce the peak current by using the display method provided in this embodiment of this application. For example, the another device may be a mobile phone. The mobile phone includes two display screens. The mobile phone may stagger display times of the two display screens, so as to reduce a peak current of the mobile phone.

In addition, the foregoing description is given by using an example in which the electronic device includes two display screens. When the electronic device includes M (M is an integer greater than 2) display screens, the display method provided in this embodiment of this application may also be used to reduce the peak current. For example, the M display screens may include a plurality of groups of display screens, each group of display screens may include at least one display screen, and a display time of one group of display screens and a display time of another group of display screens may be staggered, thereby reducing the peak current of the electronic device.

For example, the electronic device includes nine display screens, which may be classified into three groups. Each group includes three display screens. In a solution, display times of the groups of display screens are staggered. In another solution, a first group of display screens and a second group of display screens are simultaneously displayed; display times of the first group of display screens and the second group of display screens are staggered from a display time of a third group of display screens.

In addition, in another embodiment of this application, when the electronic device is powered on for the first time or each time, or on a use interface of the electronic device, the electronic device may display prompt information, to prompt the user that different display screens of the electronic device may perform displaying in a staggered manner, thereby reducing the peak current of the electronic device and improving system stability of the electronic device. Alternatively, a document such as a description document or a development document of the electronic device may indicate that different display screens of the electronic device may perform displaying in a staggered manner, thereby reducing the peak current of the electronic device and improving system stability of the electronic device.

Figure 15:
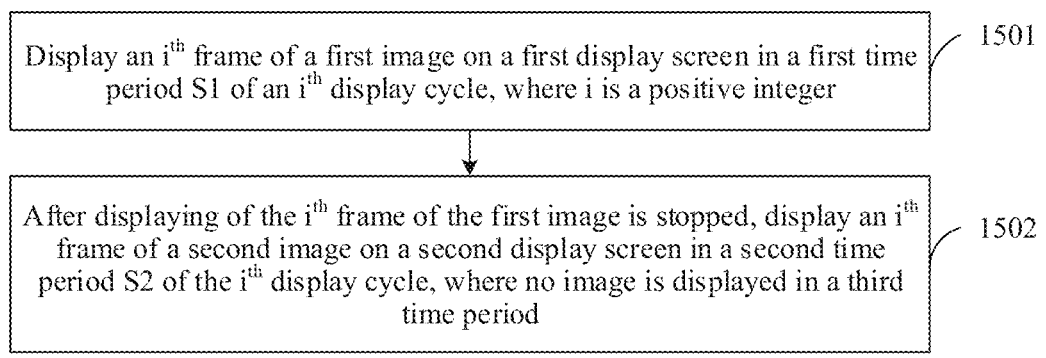
FIG. 15 is a flowchart of an image display method according to an embodiment of this application.

With reference to the foregoing embodiments and the corresponding accompanying drawings, another embodiment of this application provides an image display method for a head mounted display. The method may be implemented on a head mounted display having a structure shown in FIG. 3. For example, the head mounted display may be an augmented reality AR/VR/MR head mounted display or the like. The head mounted display may include a first display screen and a second display screen. The head mounted display may display a first image and a second image in a staggered manner on the first display screen and the second display screen in each display cycle. Referring to FIG. 15, the method may include the following steps:

1501. The head mounted display displays an $i^{th}$ frame of a first image on the first display screen in a first time period S1 of an $i^{th}$ display cycle, where i is a positive integer.

For example, the first display screen may be the left display screen described in the foregoing embodiments, and the second display screen may be the right display screen described in the foregoing embodiments. In a display cycle T, a first time period S1 may be T1 shown in FIG. 5C, FIG. 7, FIG. 10, or FIG. 11.

1502. After stopping displaying the $i^{th}$ frame of the first image, the head mounted display displays an $i^{th}$ frame of a second image on the second display screen in a second time period S2 of an $i^{th}$ display cycle.

The head mounted display displays the $i^{th}$ frame of the second image after the first time period, that is, after stopping displaying the $i^{th}$ frame of the first image. For example, the $i^{th}$ frame of the first image may be the $i^{th}$ frame of left-eye image described in the foregoing embodiments, and the $i^{th}$ frame of the second image may be the $i^{th}$ frame of right-eye image described in the foregoing embodiments. For this case, refer to the diagram of a correspondence between a display time and a current shown in FIG. 5C or FIG. 7. Alternatively, the $i^{th}$ frame of the first image may be the $i^{th}$ frame of right-eye image described in the foregoing embodiments, and the $i^{th}$ frame of the second image may be the $i^{th}$ frame of left-eye image described in the foregoing embodiments. For this case, refer to the diagram of a correspondence between a display time and a current shown in FIG. 10 or FIG. 11. In other words, in each display cycle T, the head mounted display may display the first image and the second image in a staggered manner, and does not simultaneously display the first image and the second image on the left display screen and the right display screen, thereby reducing the peak current of the head mounted display.

The first time period S1 and the second time period S2 may be equal or not equal. In other words, in a same display cycle T, display duration of the first image and display duration of the second image may be the same or different. When the display duration of the first image is different from the display duration of the second image, a difference between the two display durations is relatively small, for example, the difference may be less than 2 ms.

In addition, after the second time period, no image is displayed on the first display screen and the second display screen in a third time period S3 of the $i^{th}$ display cycle, and the sum of the first time period S1, the second time period S2, and the third time period S3 is less than or equal to the display cycle. In other words, the head mounted display stops displaying the $i^{th}$ frame of the second image, and displays an $(i+1)^{th}$ frame of the first image only after a time period. Therefore, two adjacent frames of images may be displayed at an interval of a time period, thereby avoiding problems such as smearing and blurring caused by an afterglow effect of human eyes, and improving user experience.

For example, the second time period S2 may be T3 shown in FIG. 5C, FIG. 7, FIG. 10, or FIG. 11, and the third time period S3 may be T4 shown in FIG. 5C, FIG. 7, FIG. 10, or FIG. 11. The sum of T1, T3, and T4 is less than or equal to T.

In the solution described in steps 1501 and 1502, in a same display cycle, the first display screen and the second display screen may display images in a staggered manner, thereby reducing a peak current of the head mounted display. Between different display cycles, two adjacent images may be displayed at an interval of a time period, thereby avoiding problems such as smearing and blurring caused by an afterglow effect of human eyes, and improving user experience.

In some embodiments, in the $i^{th}$ display cycle, the first time period S1 is adjacent to the second time period S2, and the sum of the first time period S1, the second time period S2, and the third time period S3 is equal to the display cycle. In other words, there is no time interval between the first time period S1 and the second time period S2. In the same display cycle, after stopping displaying an image on the first display screen, the head mounted display starts to display an image on the second display screen, that is, the sum of T1, T3, and T4 is equal to T. This may minimize a probability that a user perceives asynchronous displaying of the first image and the second image, screen flickering, or incompliance with an actual situation, or feels uncomfortable, for example, dizzy. For example, for this case, refer to the diagram of a correspondence between a display time and a current shown in FIG. 5C or FIG. 10.

In some other embodiments, the first time period S1 and the second time period S2 are spaced by a fourth time period S4. In the same display cycle, the head mounted display stops displaying an image on the first display screen, and starts to display an image on the second display screen only after the fourth time period S4. The fourth time period S4 is generally short, for example, may be less than or equal to 2 ms, so that it is not easy for the user to perceive asynchronous displaying of the left-eye image and the right-eye image, screen flickering, incompliance with an actual situation, or the like, and discomfort such as dizziness is avoided for the user as much as possible. For example, the fourth time period S4 may be T2 shown in FIG. 7 or FIG. 11. For this case, refer to the diagram of a correspondence between a display time and a current shown in FIG. 7 or FIG. 11.

Another embodiment of this application provides an electronic device, including: a first display screen and a second display screen, configured to display an image; one or more processors; one or more memories; and one or more computer programs. The one or more computer programs are stored in the memory, and the one or more computer programs include instructions. When the instructions are executed by the processor, the electronic device is enabled to perform the image display method in the foregoing embodiments. For example, the electronic device may be an AR/VR/MR head mounted display.

For example, when the electronic device is the head mounted display shown in FIG. 3, the processor in the electronic device may be the processor 302 in FIG. 3, and the memory in the electronic device may be the memory 303 in FIG. 3. The first display screen in the electronic device may be the left display screen 3011 in FIG. 3, and the second display screen in the electronic device may be the right display screen 3012 in FIG. 3. The one or more computer programs are stored in the memory 303, and the one or more computer programs include instructions. When the instructions are executed by the processor 302, the head mounted electronic device is enabled to perform the image display method in the foregoing embodiments.

An embodiment of this application further provides a computer storage medium. The computer storage medium stores a computer instruction, and when the computer instruction runs on a head mounted display, the head mounted display is enabled to perform the foregoing related steps to implement the image display method in the foregoing embodiments.

An embodiment of this application further provides a computer program product. When the computer program product runs on a computer, the computer is enabled to perform the foregoing related steps to implement the image display method in the foregoing embodiments.

In addition, an embodiment of this application further provides an apparatus. The apparatus may be specifically a chip, a component, or a module. The apparatus may include a processor and a memory that are connected to each other. The memory is configured to store a computer-executable instruction. When the apparatus runs, the processor can execute the computer-executable instruction stored in the memory, so that the apparatus performs the image display methods in the foregoing method embodiments.

The head mounted display, the computer storage medium, and the computer program product or the chip provided in the embodiments of this application are all configured to perform the related methods provided above. Therefore, for beneficial effects that can be achieved by the head mounted display, the computer storage medium, and the computer program product or the chip, refer to beneficial effects of the corresponding methods provided above. Details are not described herein again.

The foregoing descriptions about implementations allow a person skilled in the art to understand that clearly, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners, and the described apparatus embodiments are merely examples. For example, the module or unit division is merely logical function division and may be another division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to a current technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An image display method for a head mounted display, wherein the head mounted display comprises a first display screen and a second display screen, and the method comprises:

displaying, by the head mounted display, an $i^{th}$ frame of a first image on the first display screen in a first time period of an $i^{th}$ display cycle, wherein i is a positive integer;

stopping, by the head mounted display, displaying the $i^{th}$ frame of the first image, and stopping, by the head mounted display, supplying power to the first display screen; and after stopping displaying the $i^{th}$ frame of the first image and stopping supplying power to the first display screen, starting, by the head mounted display, to supply power to the second display screen and displaying, by the head mounted display, an $i^{th}$ frame of a second image on the second display screen in a second time period of the $i^{th}$ display cycle, wherein after the second time period ends, no image is displayed on the first display screen and the second display screen in a third time period of the $i^{th}$ display cycle, the first time period of the $i^{th}$ display cycle is a period during which the $i^{th}$ frame of the first image is displayed on the first display screen and power is supplied to the first display screen and not supplied to the second display screen, the second time period of the $i^{th}$ display cycle is a period during which the $i^{th}$ frame of the second image is displayed on the second display screen and power is supplied to the second display screen and not supplied to the first display screen, the third time period of the $i^{th}$ display cycle is a period during which no image is displayed on the first display screen and the second display screen, in the $i^{th}$ display cycle, the second time period is immediately following the first time period, and the sum of the first time period, the second time period, and the third time period is less than or equal to the $i^{th}$ display cycle.

2. The method according to claim 1, wherein the head mounted display is an augmented reality head mounted display, a virtual reality head mounted display, or a mixed reality head mounted display.

3. The method according to claim 1, wherein the sum of the first time period, the second time period, and the third time period is equal to the $i^{th}$ display cycle.

4. The method according to claim 1, wherein the first time period and the second time period are equal.

5. The method according to claim 1, wherein the first time period and the second time period are not equal.

6. A head mounted display, comprising:
a first display screen and a second display screen, configured to display an image;
one or more processors; a memory storing one or more computer programs, wherein the one or more computer programs comprise instructions that, when executed by the one or more processors, cause the head mounted display to perform operations comprising:
displaying an $i^{th}$ frame of a first image on the first display screen in a first time period of an $i^{th}$ display cycle, wherein i is a positive integer;
stopping displaying the $i^{th}$ frame of the first image and stopping supplying power to the first display screen; and
after stopping displaying of the $i^{th}$ frame of the first image and stopping supplying power to the first display screen, starting to supply power to the second display screen and displaying an $i^{th}$ frame of a second image on the second display screen in a second time period of the $i^{th}$ display cycle, wherein
after the second time period ends, no image is displayed on the first display screen and the second display screen in a third time period of the $i^{th}$ display cycle,
the first time period of the $i^{th}$ display cycle is a period during which the $i^{th}$ frame of the first image is displayed on the first display screen and power is supplied to the first display screen and not supplied to the second display screen, the second time period of the $i^{th}$ display cycle is a period during which the $i^{th}$ frame of the second image is displayed on the second display screen and power is supplied to the second display screen and not supplied to the first display screen, the third time period of the $i^{th}$ display cycle is a period during which no image is displayed on the first display screen and the second display screen,
in the $i^{th}$ display cycle, the second time period is immediately following the first time period, and the sum of the first time period, the second time period, and the third time period is less than or equal to the $i^{th}$ display cycle.

7. The head mounted display according to claim 6, wherein the head mounted display is an augmented reality head mounted display, a virtual reality head mounted display, or a mixed reality head mounted display.

8. The head mounted display according to claim 6, wherein the sum of the first time period, the second time period, and the third time period is equal to the $i^{th}$ display cycle.

9. The head mounted display according to claim 6, wherein the first time period and the second time period are equal.

10. The head mounted display according to claim 6, wherein the first time period and the second time period are not equal.

11. The head mounted display according to claim 6, further comprising a backlight source of the first display screen, wherein the head mounted display is further configured to, when the first display screen does not display an image, stop supplying power to the backlight source of the first display screen.

12. The head mounted display according to claim 11, further comprising a backlight driver chip configured to drive the backlight source of the first display screen to light up, wherein, when the backlight source of the first display screen is not powered when the first display screen does not display an image, the backlight driver chip is powered.

13. A non-transitory computer-readable storage medium storing one or more programs including instructions, which, when executed by one or more processors of an electronic device, cause the electronic device to:
display an $i^{th}$ frame of a first image on a first display screen in a first time period of an $i^{th}$ display cycle, wherein i is a positive integer;
stop displaying the $i^{th}$ frame of the first image and stop supplying power to the first display screen; and
after stopping displaying of the $i^{th}$ frame of the first image and stopping supplying power to the first display screen, start to supply power to a second display screen and display an $i^{th}$ frame of a second image on the second display screen in a second time period of the $i^{th}$ display cycle, wherein
after the second time period ends, no image is displayed on the first display screen and the second display screen in a third time period of the $i^{th}$ display cycle,
the first time period of the $i^{th}$ display cycle is a period during which the $i^{th}$ frame of the first image is displayed on the first display screen and power is supplied to the first display screen and not supplied to the second display screen, the second time period of the $i^{th}$ display cycle is a period during which the $i^{th}$ frame of the second image is displayed on the second display screen and power is supplied to the second display screen and not supplied to the first display screen, the third time period of the $i^{th}$ display cycle is a period during which no image is displayed on the first display screen and the second display screen,
in the $i^{th}$ display cycle, the second time period is immediately following the first time period, and the sum of the first time period, the second time period, and the third time period is less than or equal to the $i^{th}$ display cycle.

14. The non-transitory computer-readable storage medium of claim 13, wherein the sum of the first time period, the second time period, and the third time period is equal to the $i^{th}$ display cycle.

15. The non-transitory computer-readable storage medium according to claim 13, wherein the first time period and the second time period are equal.

16. The non-transitory computer-readable storage medium according to claim 13, wherein the first time period and the second time period are not equal.

* * * * *